United States Patent
Soga

(10) Patent No.: US 8,503,020 B2
(45) Date of Patent: Aug. 6, 2013

(54) DOCUMENT MANAGEMENT SYSTEM, DOCUMENT MANAGEMENT METHOD, AND STORAGE MEDIUM

(75) Inventor: Masaya Soga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/050,492

(22) Filed: Mar. 17, 2011

(65) Prior Publication Data

US 2011/0242568 A1      Oct. 6, 2011

(30) Foreign Application Priority Data

Apr. 2, 2010   (JP) ................................ 2010-086028

(51) Int. Cl.
*G06F 3/12* (2006.01)
*H04N 1/00* (2006.01)

(52) U.S. Cl.
USPC ........................... 358/1.15; 358/1.13; 358/1.6

(58) Field of Classification Search
None
See application file for complete search history.

(56) References Cited

U.S. PATENT DOCUMENTS

| | | | |
|---|---|---|---|
| 2008/0212131 A1* | 9/2008 | Osada | 358/1.15 |
| 2008/0252922 A1* | 10/2008 | Ikegami et al. | 358/1.15 |
| 2009/0006989 A1* | 1/2009 | Park | 715/762 |
| 2009/0185219 A1* | 7/2009 | Yagi | 358/1.15 |
| 2010/0202016 A1* | 8/2010 | Matsuzawa | 358/1.15 |

FOREIGN PATENT DOCUMENTS

JP   2009-111612   5/2009

* cited by examiner

*Primary Examiner* — Dov Popovici
(74) *Attorney, Agent, or Firm* — Fitzpatrick, Cella, Harper & Scinto

(57) ABSTRACT

In a conventional technique, it was impossible to execute processings up to an arbitrary processing among a series of registered processings depending on the situation from time to time. Thus, the only option in such a case was to newly register a new workflow depending on the need changing and depending on time. To solve this, a series of registered processings are displayed as a menu so that a user can select up to which processing in the series of processings should be executed. A not selected remaining processing can be executed by the user by allowing the user to later select a document once subjected to operations.

12 Claims, 26 Drawing Sheets

```
<ButtonSetting>
    <ButtonInformation>
        <ButtonID>1</ButtonID>
        <ButtonName>SCAN BUTTON 1</ButtonName>
    </ButtonInformation>
    <ScanSetting>
        <ColorMode>Fullcolor</ColorMode>
        <PageLayout>2in1</PageLayout>
        <TargetFolder>FolderC</TargetFolder>
    </ScanSetting>
</ButtonSetting>
```

FIG.6

```
<ButtonSetting>
   <ButtonInformation>
      <ButtonID>1</ButtonID>
      <ButtonName>SCAN BUTTON 1</ButtonName>
   </ButtonInformation>
   <ScanSetting>
      <ColorMode>Fullcolor</ColorMode>
      <PageLayout>2in1</PageLayout>
      <TargetFolder>FolderC</TargetFolder>
   </ScanSetting>
   <MenuSetting> ～1001
      <Menu1>                                      1002
         <Name>TRANSFER TO ANOTHER FOLDER</Name>
         <OperationID>1</OperationID> ～1005
      </Menu1>
       <Menu2>                                     1003
         <Name>COMBINE WITH ANOTHER DOCUMENT DATA</Name>
         <OperationID>2</OperationID> ～1006
      </Menu2>
       <Menu3>              1004
         <Name>MAIL DELIVERY </Name>
         <OperationID>3</OperationID> ～1007
      </Menu3>
   </MenuSetting>
</ButtonSetting>
```

FIG.10

| NAME | UPDATE DATE | SIZE |
|---|---|---|
| DOCUMENT C ▼ | 2009/06/09 | 49KB |
| COMBINE WITH ANOTHER DOCUMENT DATA ▶ | MAIL DELIVERY | |

FIG.14

```xml
<ButtonSetting>
  <ButtonInformation>
    <ButtonID>1</ButtonID>
    <ButtonName>SCAN BUTTON 1</ButtonName>
  </ButtonInformation>
  <ScanSetting>
    <ColorMode>Fullcolor</ColorMode>
    <PageLayout>2in1</PageLayout>
    <TargetFolder>FolderC</TargetFolder>
  </ScanSetting>
  <MenuSetting>～1001
    <Flow ID="1">
      <Menu ID="1">
        <Operation ID="1">
          <Name>TRANSFER TO ANOTHER FOLDER</Name>
          <Operation ID="1-1">
            <Name>COMBINE WITH ANOTHER DOCUMENT DATA</Name>
            <Operation ID="1-1-1">
              <Name>MAIL DELIVERY</Name>
            </Operation>
          </Operation>
          <Operation ID="1-2">
            <Name>PDF CONVERSION</Name>
            <Operation ID="1-2-1">
              <Name>ANNOTATION</Name>
            </Operation>
            <Operation ID="1-2-2">
              <Name>MAIL DELIVERY</Name>
            </Operation>
          </Operation>
          <Operation ID="1-3">
            <Name>COPY</Name>
          </Operation>
        </Operation>
      </Menu>
    </Flow>
  </MenuSetting>
</ButtonSetting>
```

FIG.15

```
<ButtonSetting>
    <ButtonInformation>
        <ButtonID>1</ButtonID>
        <ButtonName>PRINT BUTTON 1</ButtonName>
    </ButtonInformation>
    <PrintSetting>
        <ColorMode>Fullcolor</ColorMode>
        <PageLayout>2in1</PageLayout>
        <TargetDocument>DocumentA</TargetDocument>
    </PrintSetting>
</ButtonSetting>
```

FIG.17

```
<ButtonSetting>
    <ButtonInformation>
        <ButtonID>1</ButtonID>
        <ButtonName>SCAN BUTTON 1</ButtonName>
    </ButtonInformation>
    <PrintSetting>
        <ColorMode>Fullcolor</ColorMode>
        <PageLayout>2in1</PageLayout>
        <TargetDocument>DocumentA</TargetDocument>
    </PrintSetting>
    <MenuSetting>  ~2101
        <Menu1>                                              2102
            <Name>FAX TRANSMISSION</Name>
            <OperationID>4</OperationID>  ~2104
        </Menu1>
         <Menu2>                                             2103
            <Name>TRANSFER TO TRASH BOX FOLDER</Name>
            <OperationID>5</OperationID>  ~2105
        </Menu3>
    </MenuSetting>
</ButtonSetting>
```

FIG.21

| NAME | UPDATE DATE | SIZE |
|---|---|---|
| DOCUMENT C ▼ | 2009/06/09 | 49KB |
| TRANSFER TO TRASH BOX FOLDER | | |

FIG.25

```xml
<ButtonSetting>
  <ButtonInformation>
    <ButtonID>1</ButtonID>
    <ButtonName>SCAN BUTTON 1</ButtonName>
  </ButtonInformation>
  <PrintSetting>
    <ColorMode>Fullcolor</ColorMode>
    <PageLayout>2in1</PageLayout>
    <TargetDocument>DocumentA</TargetDocument>
  </PrintSetting>
  <MenuSetting>～2101
    <Flow ID="1">
      <Menu ID="1">
        <Operation ID="1">
          <Name>FAX TRANSMISSION</Name>
          <Operation ID="1-1">
            <Name>TRANSFER TO TRASH BOX FOLDER</Name>
          </Operation>
          <Operation ID="1-2">
            <Name>PDF CONVERSION</Name>
            <Operation ID="1-2-1">
              <Name>TRANSFER TO TRASH BOX FOLDER</Name>
            </Operation>
          </Operation>
        </Operation>
      </Menu>
    </Flow>
  </MenuSetting>
</ButtonSetting>
```

FIG.26

DOCUMENT MANAGEMENT SYSTEM, DOCUMENT MANAGEMENT METHOD, AND STORAGE MEDIUM

BACKGROUND OF THE INVENTION

1. Field of the Invention

The present invention relates to a document management system, a document management method, and a storage medium by which the setting of a scan/print button is combined to a processing flow so that a processing based on the processing flow can be easily selected and executed during scanning/printing.

2. Description of the Related Art

In recent years, inure PCs in an office environment have been web-based. Thus, more multi-function peripherals (MFP) also have web-based Using one or another technique that vary from one company to another. Among such techniques, an efficient use method that uses the characteristics of the respective web-linked client PCs and MFPs has attracted attention. Generally, PCs are exclusively used by respective individuals while MFPs are shared by a plurality of persons. Thus, there is a demand to minimize the time required for the individual users to use the MFPs. In order to satisfy such a demand, the current MFPs have, for example, a function by which documents scanned through the MFPs can be stored in a document management server or a folder of a file server. In such a case, a client PC can be used to set a folder for storing the document and a button corresponding to the setting can be selected through an MFP browser to thereby store the scanned document in a document management server or a folder of a file server. Another function is also available by which, instead of scanning a document, an operation such as "giving an annotation" or "combining with another document data" is registered as a workflow so that the user can only have to push a scan button to perform a series of processings. Such a function is not limited to scanning and can be similarly used for printing.

With regard to this point, Japanese Patent Laid-Open No. 2009-111612 suggests, for example, a system in which a template is prepared in advance and the template is compared with various operations performed through the MFP. When one of the operations matches the template, then the series of operations can be registered as a workflow.

In the office PC environment as described above, there may be a case where document data obtained by scanning a document through the MFP to store the data in a document management server for example is subsequently subjected to various operations such as "transfer to another folder" or "combine with another document data". According to Japanese Patent Laid-Open No. 2009-111612, a workflow based on a user operation history can be registered as a series of processings so that the series of processings can be collectively executed through a scan button or a print button. When three processings "transfer to another folder", "combine with another document data", and "mail delivery" are registered as a workflow to be associated with a scan button, for example, these three processings are sequentially executed when the scan button is depressed. However, the series of processings having the same contents are not always required when a user tries to scan a document. Specifically, there may a case in the above example where a user only wants to finish the processings up to "combine with another document data". Regardless of this, the technique according to Japanese Patent Laid-Open No. 2009-111612 automatically executes all of the series of processings once the scan button associated with the workflow is depressed. Thus, even when the user wants to finish the processing up to "combine with another document data", the processings to "mail delivery" are automatically executed once the scan button is depressed. As described above, in the case of the technique according to Japanese Patent Laid-Open No. 2009-111612, the user could not finish the processings up to an arbitrary processing among the series of registered processings depending on the situation from time to time. Thus, the only option was to register, on a case-by-case basis, a new workflow depending on the need from time to time.

SUMMARY OF THE INVENTION

A document management system according to the present invention is a document management system that includes an MFP having a scanner function, a web application server PC for storing and managing document data, and a client PC through which a user instructs an operation regarding the document data. The MFP, the web application server PC, and the client PC are connected via a network. In the document management system, the MFP includes: a user interface; a component for acquiring, from the web application server PC, scan setting information including a processing flow that can be executed after scanning to display the processing flow as a scan menu on the user interface; and a component for generating menu selection information that shows a processing selected by a user from the processing flow displayed as the menu. The web application server PC includes a component for storing the scan setting information; and an execution component for acquiring the menu selection information from the MFP to execute, after scanning and based on the processing flow, processings up to the processing selected by the user.

According to the present invention, various processings that are frequently executed after scanning or printing can be executed efficiently.

Further features of the present invention will become apparent from the following description of exemplary embodiments (with reference to the attached drawings)

BRIEF DESCRIPTION OF THE DRAWINGS

FIG. 6 illustrates the data structure of scan setting information described by XML;

FIG. 10 illustrates the data structure of the scan setting information which is described by XML and in which user operation information is additionally registered as a menu;

FIG. 14 shows an example of a display mode of the processing associated with the scanned document data according to the first embodiment;

FIG. 15 illustrates the data structure of scan setting information in which user operation information described by XML is additionally registered;

FIG. 17 illustrates the data structure of print setting information described by XML;

FIG. 21 illustrates the data structure of print setting information which is described by XML and in which the user operation information is additionally registered as a menu;

FIG. 25 shows an example of a display mode of the processing associated with the print document data according to the second embodiment; and FIG. 26 illustrates the data structure of print setting information which is described by XML and in which user operation information is repeatedly and additionally registered.

DESCRIPTION OF THE EMBODIMENTS

The following section will describe the best mode for carrying out the present invention.

First Embodiment

System Configuration

Figure 1:
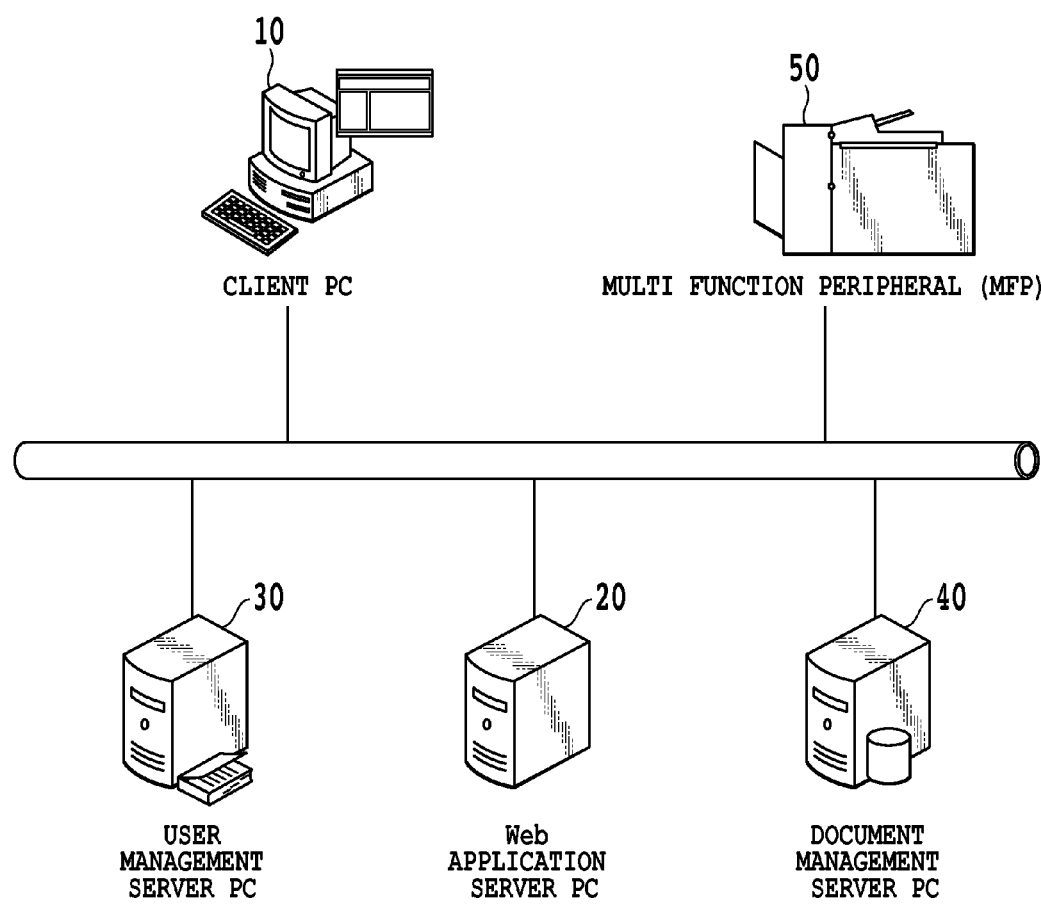
FIG. 1 shows an example of a system configuration diagram of the document management system according to the present invention.

FIG. 1 shows an example of the system configuration diagram of the document management system according to the present invention.

A client PC 10 is a computer to allow a user to give various operation instructions with regard to document data stored and managed by this document management system. The user can access this document management system via a not-shown user interlace (UI). In this embodiment, the UI is configured by using a web browser to display information on a display 108.

A web application server PC 20 is a server computer that provides a web application in this document management system.

A user management server PC 30 is a server computer for managing the information of a user accessing this document management system.

A document management server PC 40 is a server computer that has a function to store and manage a document.

An MFP 50 is a Multi-Function Peripheral (MFP) that has a plurality of functions such as a printer, a scanner, copying, or FAX. The user can access this document management system via a not-shown UI. In this embodiment, the UI is configured by using a web browser to display information on a display device 201.

The client PC 10, the web application server PC 20, the user management server PC 30, the document management server PC 40, and the MFP 50 are connected via a network, respectively.

In the example of FIG. 1, the web application server PC 20, the user management server PC 30, and the document management server PC 40 are configured as separate apparatuses but also may be configured as one server computer having these functions.

The following description will be made based on an assumption that various operation instructions from a user is issued through the client PC 10. However, the present invention is not limited to this. Another configuration also may be used where any or all of other server PCs 20 to 40 additionally function(s) as a client PC as to issue various operation instructions.

The respective functions such as scanning or printing are executed by a scanner function and a print function included in the MFP 50. However, another configuration also may be used where such functions are executed by an independent scanner or printer connected to the client PC 10.

In this embodiment, the document management system is accessed via the UIs using web browsers in the client PC 10 and the MFP 50. However, another configuration also may be used where an exclusive client application is provided in the client PC 10 and the MFP 50 to access the document management system for example. In this case, such a configuration may be used in which the exclusive client application communicates not with the web application server PC 20 but with the document management server PC 40.

(Hardware Configuration)

Figure 2:
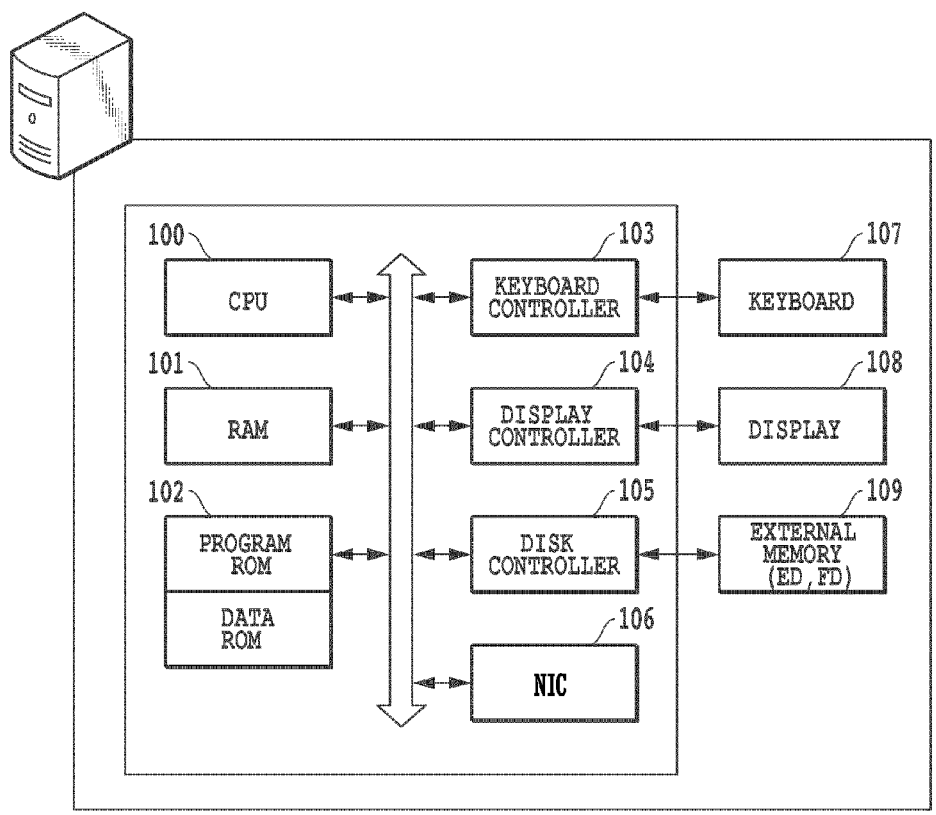
FIG. 2 shows an example of a hardware configuration of a client PC and each server PC.
Figure 3:
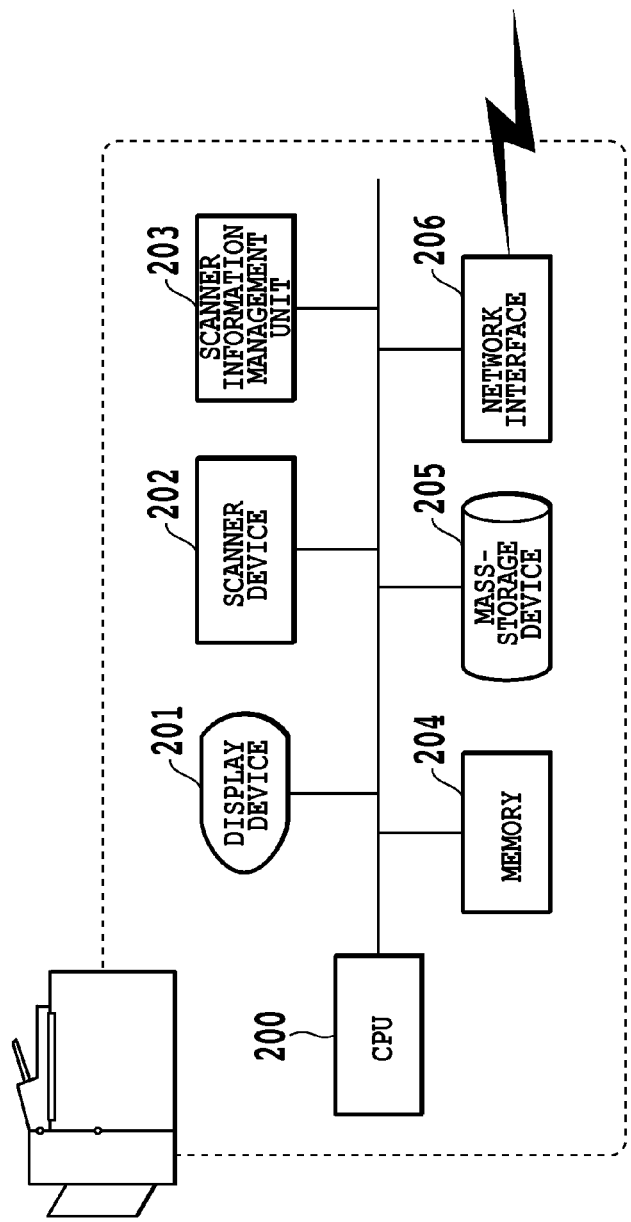
FIG. 3 shows an example of an MFP hardware configuration.

FIG. 2 shows an example of the hardware configuration of the client PC 10 and the respective servers PC 20 to 40. FIG. 3 shows an example of the MFP hardware configuration.

In FIG. 2, the CPU 100 executes a program stored in a program ROM of the ROM 102 or a program such as the OS or application loaded from a hard disk 109 to a RAM 101. The term "OS" is an abbreviation of an operating system operating on a computer. Various processings described with reference to flowcharts (which will be described later) are realized by executing this program. The RAM 101 functions as a main memory or a work area for example of the CPU 100. A keyboard controller 103 controls the key input from a keyboard 107 or a not-shown pointing device. A display controller 104 controls various displays on the display 108. A disk controller 105 controls the access to various data stored in a hard disk (HD) 109 or a floppy (registered trademark) disk (FD) for example. A Network Interface Card (NIC) 106 is connected to a network and executes a processing for controlling communication with other devices connected to the network.

In FIG. 3, the CPU 200 is a processor to control the MFP 50 in an integrated manner and controls the respective apparatuses (which will be described later) for example that are connected via an internal bus. The display device 201 is a device such as a touch panel for providing a display on a screen. A user performs an operation for performing, a desired processing for example through the screen displayed on the display device 201. A scanner device 202 is a device for performing a scan operation. A scanner information management unit 203 manages and retains the information for the function and status of the scanner device 202. A memory 204 stores therein various commands (including application programs) executed by the CPU 200 to control the MFP 50. A mass-storage device 205 temporarily stores the data obtained through the scan by the scanner device 202. Based on the CPU 200, a network interlace 206 sends and receives signals via LAN.

(Software Configuration)

Figure 4:
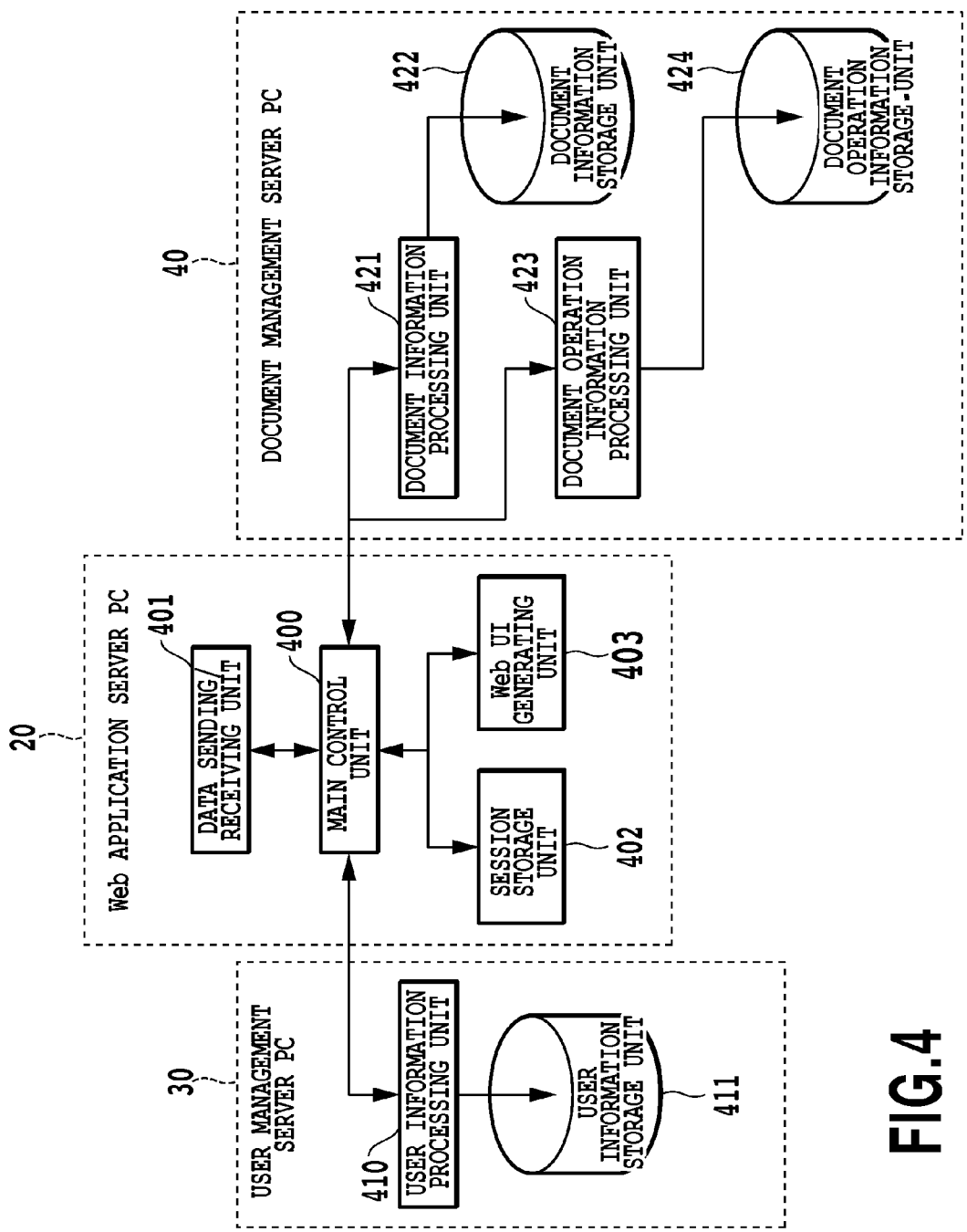
FIG. 4 shows an example of a software configuration of the document management system according to the present invention.

FIG. 4 shows an example of a software configuration of this document management system. The broken line shows the web application server PC 20, the user management server PC 30, and the document management server PC 40, respectively.

A main control unit 400 controls the entirety of this document management system and instructs and manages the respective units (which will be described later).

A data transmission/reception unit 401 receives an operation instruction from a user given through the UI of the client PC 10 or the MFP 50. The data transmission/reception unit 401 also receives the processing result based on the operation instruction from the main control unit 400 and sends the result to the client PC 10 or the MFP 50.

A session storage unit 402 generates session information showing an access by an identical user when the user accesses this document management system via the client PC 10 and the MFP 50. The session storage unit 402 also retains various information repeatedly used until the user stops accessing this document management system (logout) or until the session is stopped due to an automatic timeout so that the information is associated with the session information.

Based on the instruction from the main control unit 400, a web UI generating unit 403 generates a web UI depending on the situation. The web UI generating unit 403 may generate web UIs such as HTML in which a script language such as JavaScript is embedded.

Based on the instruction from the main control unit 400, a user information processing unit 410 performs, for example, processings such as the extraction or setting of the information that is stored in the user information storage unit 411 and that is used to manage a user accessing this document management system or the information for the respective settings for the individual users (user setting information). The user management also may be carried out by linking a known technique such as ActiveDirectory or LDAP to the user information processing unit 410 so that the user information storage unit 411 stores the user setting information only.

A document information processing unit 421 performs, based on the instruction from the main control unit 400, the processing such as the registration, storage, extraction, or editing of the document data to the document information storage unit 422 or the attribute information (including index information) of the document data. A document information storage unit 422 also stores information for a menu operable to document data (processing flow) (which will be described below).

A document operation information processing unit 423 stores, based on the instruction from the main control unit 400, the contents of the operation instruction from a user regarding the document data (user operation information) in a document operation information storage unit 424.

The following section will describe the details of the document management system that can efficiently execute a specific processing frequently executed after scanning according to the first embodiment.

(Processing for Setting Scan Button)

First, the following section will describe a processing for setting the details of the scan button used by the user to instruct a scan processing through the MFP 50 (i.e., a processing for registering scan setting information).

Figure 5:
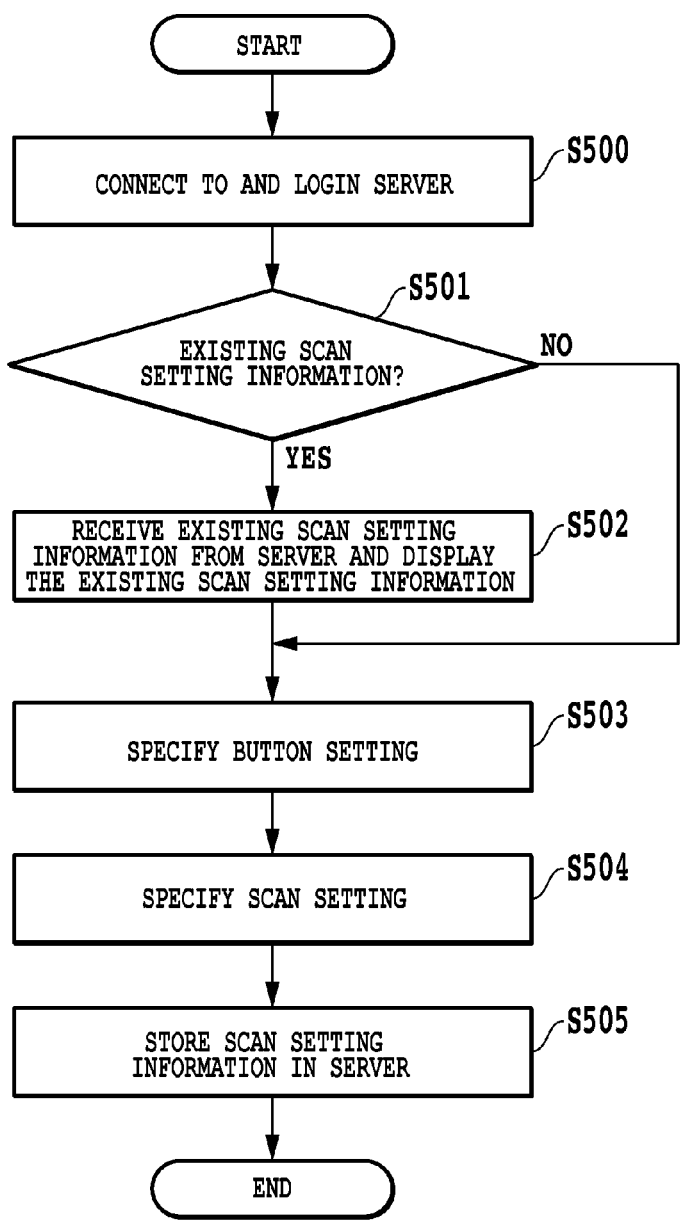
FIG. 5 is a flowchart illustrating the flow of a processing for registering scan setting information according to the first embodiment.

FIG. 5 is a flowchart illustrating the flow of a processing for registering scan setting information. The following section will describe a case where the scan setting information is registered through the client PC 10. However, the scan setting information also may be set through each server PC or the MFP 50.

First, in Step 500, the user logs in on the document management system via the UI of the client PC 10. Specifically, when the client PC 10 is connected to the web application server PC 20 and user authentication by the user management server PC 30 is executed under the control by a main control unit 400. When the access authority of the user is confirmed, the processing proceeds to Step 501.

Next, in Step 501, the web application server PC 20 confirms, via the main control unit 400, whether the scan setting information is registered in a user information storage unit 411 or not. When the scan setting information is already registered, the processing proceeds to Step 502. When the scan setting information is not registered, the processing proceeds to Step 503.

In Step 502, the client PC 10 acquires the already-registered scan setting information to display the information on the display 108 of the client PC 10.

In Step 503, the client PC 10 receives, via the keyboard 107, the setting regarding the scan button used by the user to instruct scanning. This button setting includes information for a button ID, a button name, and a button display form for example.

In Step 504, the client PC 10 receives, via the keyboard 107, the setting regarding the details of the scan (scan setting). The contents of the scan setting includes, for example, a color/black-and-white mode for scanning, a page layout such as 2-in-1, and a folder for storing a scanned document. The button setting in Step 503 and the scan setting in Step 504 are hereinafter called "scan setting information". The scan setting information is stored in a data format described by XML as shown in FIG. 6 for example.

In Step 505, the client PC 10 sends the scan setting information to the web application server PC 20. The web application server PC 20 stores the received scan setting information in the user information storage unit 411 via the main control unit 400.

(Processing for Initial Scanning)

Figure 7:
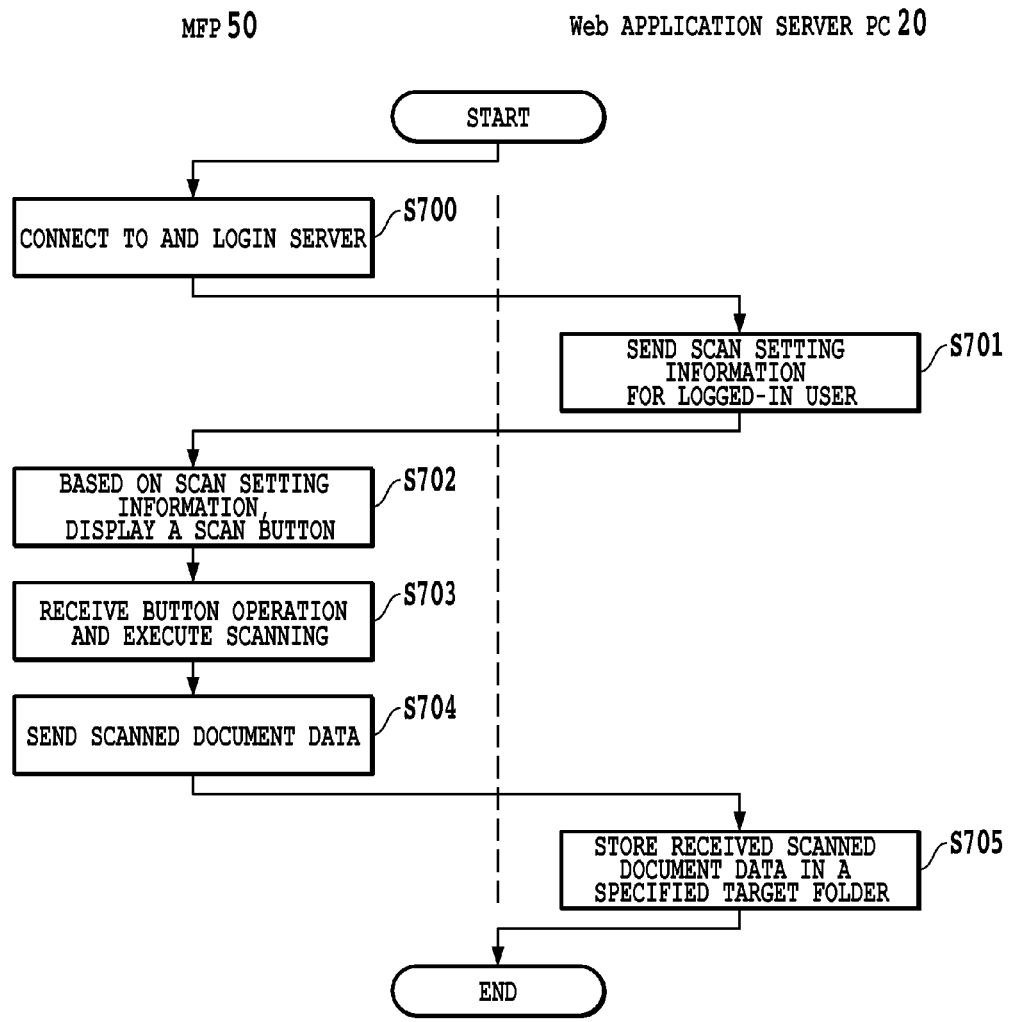
FIG. 7 is a flowchart illustrating the flow of the initial scan processing according to the first embodiment.

FIG. 7 is a flowchart illustrating the flow of the processing for the initial scan in the document management system according to this embodiment. In the following flowchart, only shown for convenience is the MFP 50 or the client PC 10 and the web application server PC 20 including the main control unit 400 to which an operation instruction is directly given from a user. The flowchart omits the user management server PC 30 and the document management server PC 40 that performs the above-described predetermined functions under the control by the main control unit 400. Thus, the user management server PC 30 and the document management server PC 40 will be appropriately referred to in the description for the respective steps.

In Step 700, the user connects to the web application server PC 20 via the MFP 50 and logs in the document management system. Then, when, under the control by a main control unit 400, the user authentication by the user management server PC 30 is executed and the access authority of the user is confirmed, the processing proceeds to Step 701.

Next, in Step 701, the web application server PC 20 confirms, via the main control unit 400, whether the scan setting information is already registered in the user information storage unit 411 or not. When the scan setting information is already registered, the scan setting information is acquired and is sent to the MFP 50.

In Step 702, the MFP 50 displays, based on the received scan setting information, a scan button on the display device 201.

In Step 703, when the MFP 50 receives the depression of the scan button by the user, the MFP 50 executes a scanning.

In Step 704, the MFP 50 sends, to the web application server PC 20, the scanned document data obtained through the scanning.

In Step 705, the web application server PC 20 stores the received scanned document data in a target folder in the document management server PC 30 specified by the scan setting information.

In Step 703, the user also can, prior to the depression of the scan button, change the contents of the scan setting (e.g., change from "2-in-1" to "4-in-1"). In this case, the scanning is executed based on the changed contents. In Step 704, the scanned document data and the changed scan setting information are sent to the web application server PC 20. Then, the web application server PC 20 updates the received changed scan setting information as the scan setting information of the user and stores the changed scan setting information in the user information storage unit 411.

(Processing for Additional Registration in Scan Setting Information)

Figure 8:
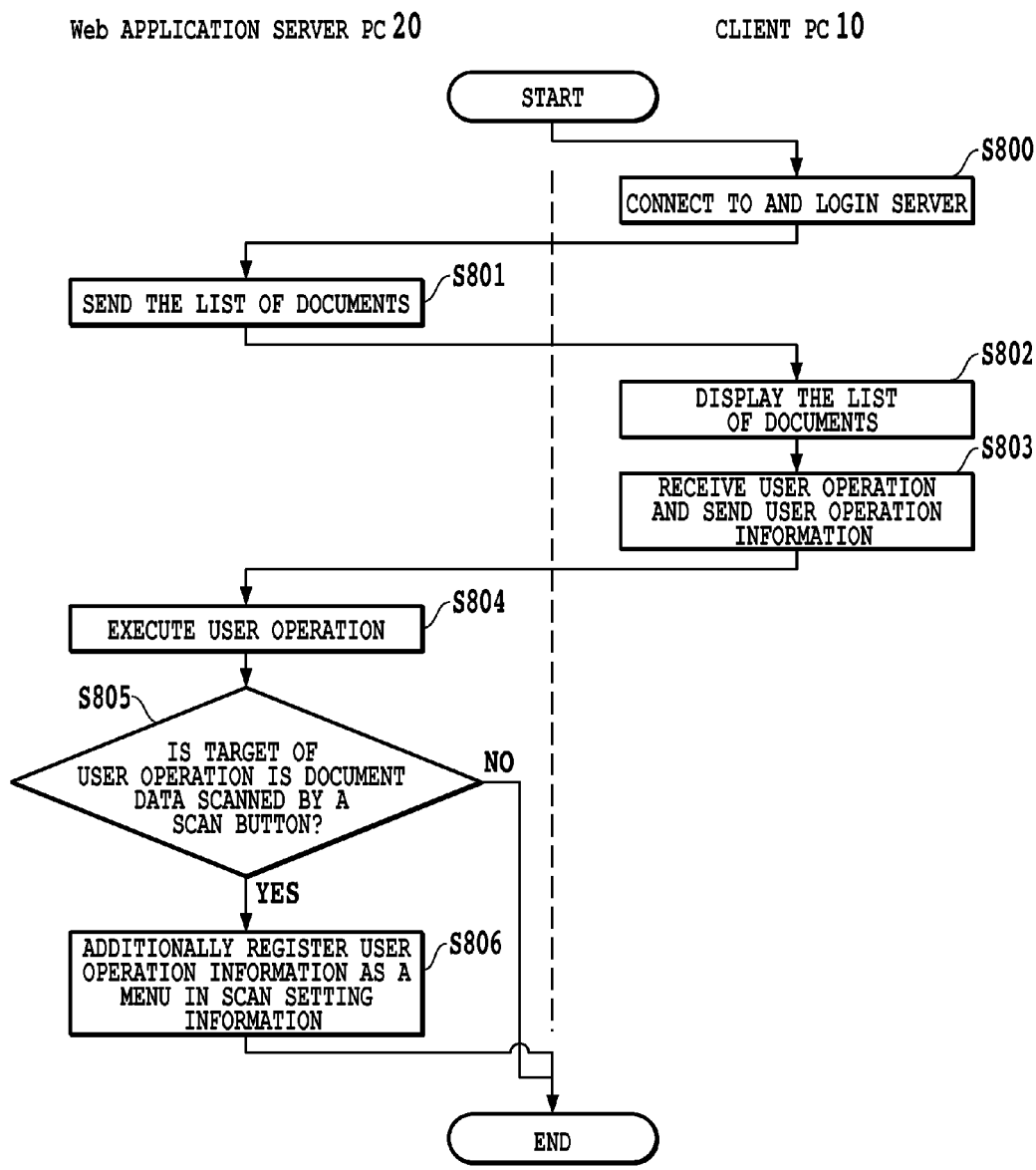
FIG. 8 is a flowchart illustrating the flow of a processing for additional registration in scan setting information according to the first embodiment.

FIG. 8 is a flowchart illustrating the flow of the processing for additionally registering, when a user gives an instruction an arbitrary processing to the scanned document data stored in the target folder in the document management server PC 30, the user operation information according to the instruction in the scan setting information.

First, in Step 800, the user connects to the web application server PC 20 via the client PC 10 and logs in the document management system. Under the control by the main control unit 400, the user authentication by the user management server PC 30 is executed. When the access authority of the user is confirmed, then the processing proceeds to Step 801.

Next, in Step 801, the web application server PC 20 sends, via the main control unit 400, the information for the list of the document data regarding the logged-in user stored in the document information storage unit 422 to the client PC 10.

In Step 802, the client PC 10 displays, based on the received information for the list of the document data, the list of documents on the display 108. The list of documents is displayed in a tree structure for example.

In Step 803, an operation instruction from the user with regard to the document data selected by the user from among the displayed list is received. Then, user operation information is generated that shows the contents of the instruction. Then, the user operation information is sent to the web application server PC 20. The operation instruction means, for example, an instruction given from the user for the execution of a predetermined processing such as "transfer to another folder" or "combine with another document data". Operation instructions that can be received are not limited to one and thus a plurality of operation instructions also may be received. For example, a plurality of operation instructions for a plurality of processings may be received such as an operation instruction for the transfer to another folder followed by an operation instruction for the combination with another document data. When a plurality of operation instructions are received as described above, such user operation information is generated that causes the plurality of processings to be executed in the order of receipt and in chronological order.

In Step 804, the web application server PC 20 executes, based on the received user operation information, the contents of the operation instruction (e.g., transfer to another folder). The web application server PC 20 attaches user operation IDs to the respective operation instructions included in the user operation information. These user operation IDs provides the identification of the individual operation instructions. Then, the web application server PC 20 registers the user operation information in the document operation information storage unit 424.

In Step 805, the web application server PC 20 determines whether the document data of the operation instruction target executed based on the user operation information is document data scanned by the scan button set through the above-described processing of FIG. 5 or not. This determination is performed by checking a predetermined identifier given to the document data. Specifically, the determination as described above is achieved by, when the scanning is executed and the document data is stored, providing the document data property with a flag for identifying that the data is for the scanned document (e.g., 1: scanned document, 0: not-scanned document) for example. Instead of such a flag, a text of "scan document" for example may be given to the document data during scanning as an index so that the above determination may be performed based on the existence or nonexistence of such an index. When the determination result shows that the document data is document data scanned by the scan button, the processing proceeds to Step 806. When the determination result shows that the document data is document data other than the one scanned by the scan button, this processing is completed.

Figure 9:
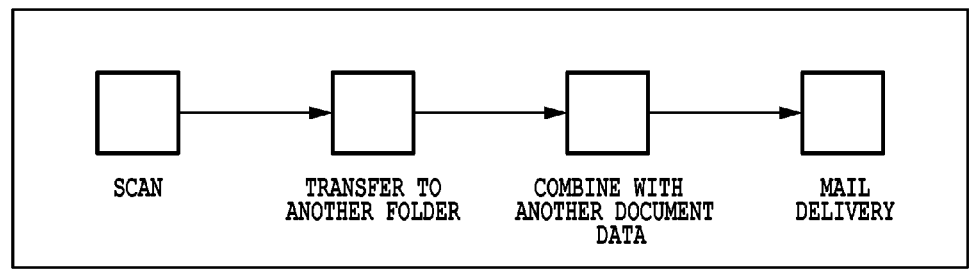
FIG. 9 shows an example of the processing flow additionally registered as a menu in scan setting information according to the first embodiment.

In Step 806, the web application server PC 20 adds, to the scan setting information regarding the scan button used for the scanning of the scanned document data, the contents of the user operation information as a menu for scanning. Specifically, in the scan setting information set through the above-described processing for registering scan setting information (FIG. 5), the respective processing executed in Step 804 are additionally registered as a flow of the processings that can be executed after the scanning. When a plurality of operation instructions are given in Step 803, a series of processings corresponding to the operation instructions are additionally registered in the scan setting information as a flow of the processings in an order of the instructions. For example, when such operation instructions are given for scanned document data that instruct to perform three processings of transferring the data to another folder to subsequently combine the data with another document data to finally send the data via an e-mail, the processing flow as shown in FIG. 9 is additionally registered as a menu. Specifically, the processing flow of a series of processings from "scanning" to "mail delivery" is registered as a scanning menu in the scan setting information. FIG. 10 shows an example of XML-described scan setting information in which user operation information is additionally registered as a menu. As shown, the user operation information for instructing the above-described three processings is additionally registered in the scan setting information. A new item of "MenuSetting (1001)" is added. The respective processings of "transfer to another folder (1002)", "combine with another document data (1003)", and "mail delivery (1004)" are additionally registered. "OperationID (1005 to 1007)" given to the respective processings correspond to the respective user operation IDs registered in the document operation information storage unit 424 in Step 804.

(Processing for Second and Subsequent Scannings)

Figure 11:
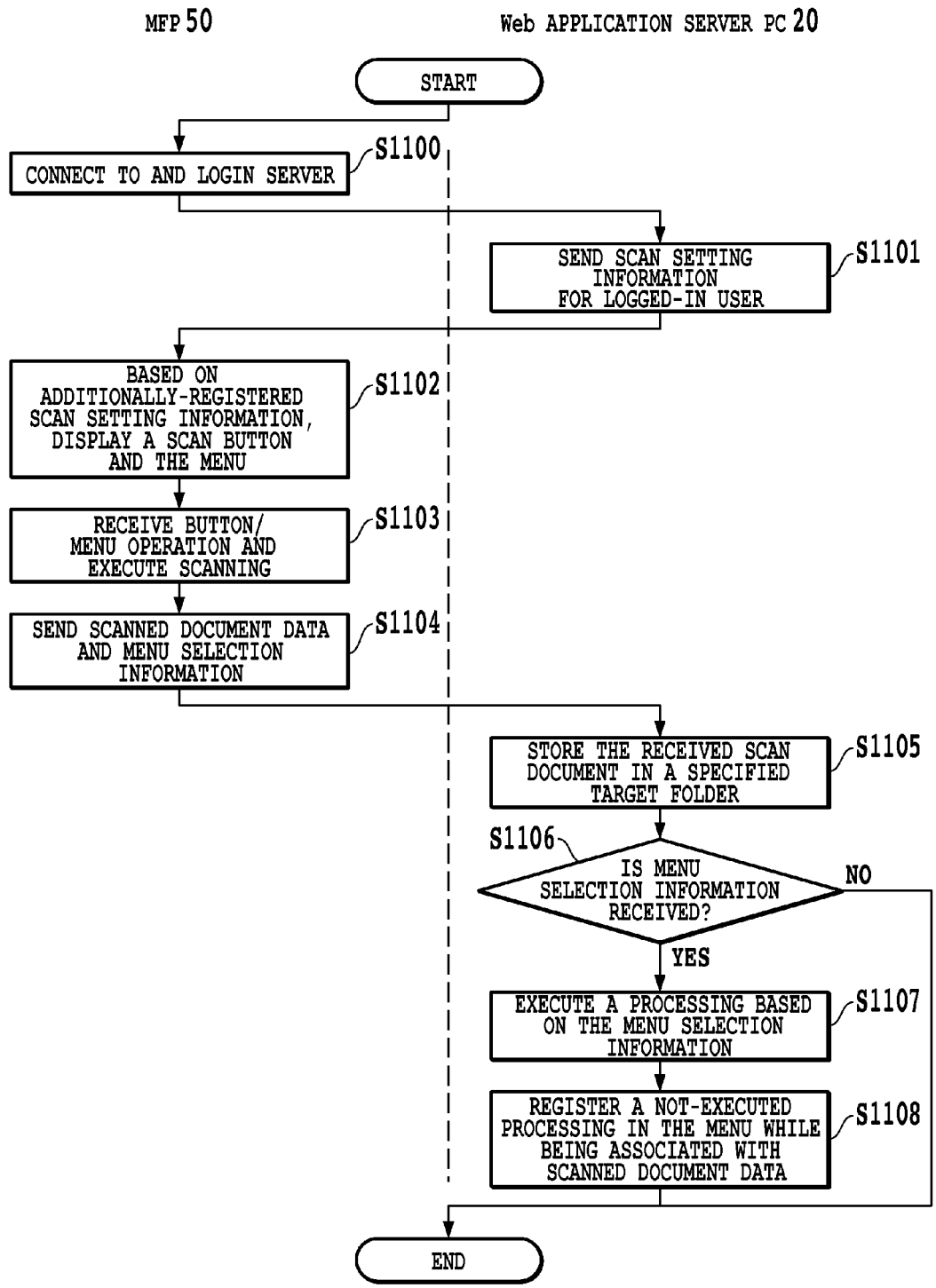
FIG. 11 is a flowchart illustrating the flow of the processings during the second and subsequent scans in a document management system according to the first embodiment.

FIG. 11 is a flowchart illustrating the flow of the processing for the second and subsequent scannings.

In Step 1100, the user connects to the web application server PC 20 via the MFP 50 and logs in on the document management system. Under the control by the main control unit 400, the user authentication by the user management server PC 30 is executed. When the access authority of the user is confirmed, the processing proceeds to Step 1101.

Next, in Step 1101, the web application server PC 20 acquires, via the main control unit 400, the scan setting information registered in the user information storage unit 411 and sends the scan setting information to the MFP 50. The sent scan setting information is scan setting information additionally registered in the previous processing for additionally registering scan setting information (FIG. 8).

Figure 12A:
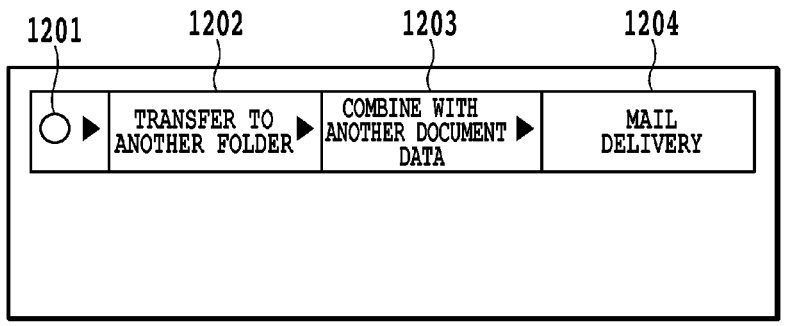
FIG. 12A to FIG. 12C illustrate a mode of a menu display based on scan setting information according to the first embodiment.

In Step 1102, the MFP 50 displays a scan button on the display device 201 based on the received scan setting information. In the scan setting information, the user operation information corresponding to the processing executed in Step 804 of FIG. 8 is additionally registered as scan setting information. Thus, the scan button and the contents of the user operation are displayed as a menu. FIG. 12A illustrates an example of the menu displayed on the display device 201 when the scan setting information is as shown in FIG. 10 as described above. At the right side of a scan button 1201, the processing flow arranged in an order "transfer to another folder", "combine with another document data", and "mail delivery" is displayed as a menu.

In Step 1103, the MFP 50 receives the depression of the scan button 1201 displayed in Step 1102 and the selection of the menu by the user. The menu selection must be performed prior to the depression of the scan button. In the example of FIG. 12A, when the user depresses any of desired processing regions 1202 to 1204, a display processing is performed to display the region in a highlighted manner so as to show that this region is selected. For example, when all processings displayed on the menu are desired to be executed after scanning, the user selects the "mail delivery" region 1204 and then depresses the scan button 1201. When the scan button is depressed, the MFP 50 executes scanning.

In Step 1104, the MFP 50 sends the document data obtained through the scanning to the web application server PC 20. When any processing is selected from the menu, the MFP 50 generates menu selection information showing the selected processing and sends the menu selection information to the web application server PC 20. For example, when the user performs an operation to select "transfer to another folder" from the menu, such menu selection information is generated that shows that scanned document data and "transfer to another folder" are selected. Then, the menu selection information is sent to the web application server PC 20.

In Step 1105, the web application server PC 20 stores the received scanned document data in a target folder specified by the scan setting information.

In Step 1106, the web application server PC 20 confirms whether menu selection information is received that is separate from the scanned document data or not. When the menu selection information is received, the processing proceeds to Step 1107. When the menu selection information is not received, the processing is completed.

In Step 1107, the web application server PC 20 executes the respective processings up to the processing shown in the received menu selection information from among those shown in the processing flow registered as a menu in the scan setting information. For example, when the processing shown by the received menu selection information is "combine with another document data", a processing is firstly executed to transfer the scanned document data to another folder. Then, a processing is executed to combine the scanned document data with another document data. As described above, based on the menu registered in the scan setting information, a series of processings up to the processing selected by the user in Step 1103 are executed by the web application server PC 20.

In Step 1108, when the processing shown by the menu selection information is not a rearmost processing in the processing flow, the web application server PC 20 associates the remaining processings to the scanned document data. In other words, when the processing flow registered as a menu still includes the remaining processings not executed in Step 1107, the remaining processings are associated with the scanned document data stored in Step 1105 and are stored in the document information storage unit 422. For example, when the user selects "transfer to another folder" from the menu, the remaining processing flow of the subsequent processings from "combine with another document data" to "mail delivery" is stored while being associated with the scanned document data.

(Processing to Scanned Document Data Associated with the Remaining Processings)

Figure 13:
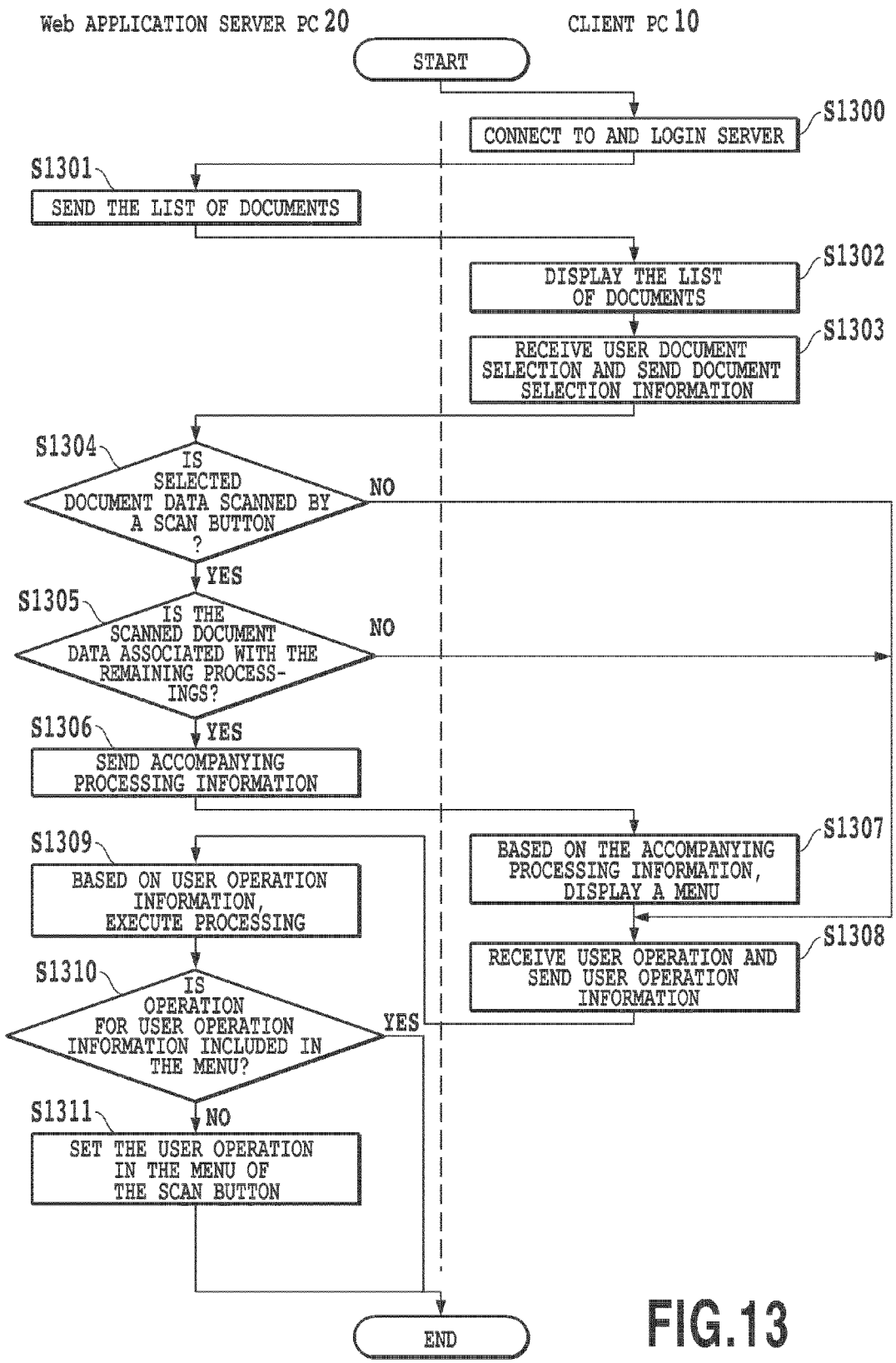
FIG. 13 is a flowchart illustrating the flow of the processing to scanned document data associated with the subsequent processing according to the first embodiment.

FIG. 13 is a flowchart illustrating the flow of the processing to the scanned document data associated with the remaining processings based on the flowchart of FIG. 11.

First, in Step 1300, the user connects to the web application server PC 20 via the client PC 10 and logs in the document management system. Under the control by the main control unit 400, the user authentication by the user management server PC 30 is executed. When the access authority of the user is confirmed, the processing proceeds to Step 1301.

Next, in Step 1301, the web application server PC 20 sends, via the main control unit 400, the information for the list of the document data stored in the document information storage unit 422 to the client PC 10.

In Step 1302, the client PC 10 displays, based on the received information for the list of the document data, the list of documents on the display 108 of the client PC 10. The list of documents is displayed in a tree structure for example.

In Step 1303, the client PC 10 receives a document selected by the user from the list of documents. Then, the client PC 10 sends document selection information showing the selected document to the web application server PC 20.

In Step 1304, the web application server PC 20 determines whether or not the selected document corresponds to the above-described document data scanned using the scan button set in FIG. 5. This determination is the same as the determination in Step 805 of FIG. 8 and thus will not be described further. When the determination result shows that the selected document corresponds the scanned document data obtained by the scan button, the processing proceeds to Step 1305. When the determination result shows that the selected document corresponds data other than the scanned document data obtained by the scan button, the processing proceeds to Step 1308.

In Step 1305, the web application server PC 20 confirms whether the scanned document data is associated with the above-described remaining processings or not. When the scanned document data is associated with the remaining processings, the processing proceeds to Step 1306. When the scanned document data is not associated with the remaining processings, the processing proceeds to Step 1308.

In Step 1306, the web application server PC 20 generates accompanying processing information that shows the remaining processings associated to the scanned document data. Then, the web application server PC 20 sends the accompanying processing information to the client PC 10.

In Step 1307, the client PC 10 displays, based on the received accompanying processing information, the remaining processings (processing flow) associated to the scanned document data on the display 108. For example, when the received accompanying processing information shows a processing flow from "combine with another document data" to "mail delivery", the remaining processings as shown in FIG. 14 are displayed. Thus, the user can subject the scanned document data for which processings up to "transfer to another folder" are completed during the first scan to the subsequent processing of "combine with another document data" or "mail delivery" at a desired timing.

In Step 1308, the client PC 10 receives the processing flow (menu) displayed in Step 1307 or an operation instruction by the user in a general function selection. Then, the client PC 10 generates user operation information that shows the processing instructed by the user to the document data selected in Step 1303. Then, the client PC 10 sends this user operation information to the web application server PC 20.

In Step 1309, the web application server PC 20 executes, based on the received user operation information, various processings instructed by the user in Step 1308.

In Step 1310, the web application server PC 20 determines whether or not the processing according to the user operation information received and executed in Step 1309 is included in the processing flow registered as a menu in the scan setting information. When the processing according to the user operation information is not included in the scan setting information, the processing proceeds to Step 1311. When the processing according to the user operation information is included in the scan setting information, the processing is completed.

Figure 12B:
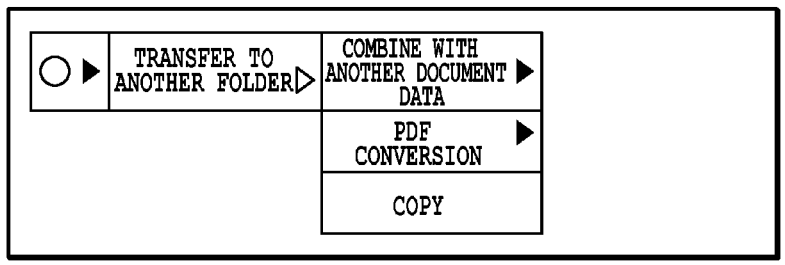
Figure 12C:
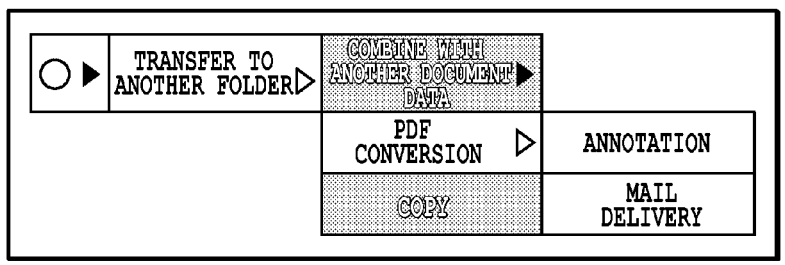

In Step 1311, the web application server PC 20 additionally registers, as a new menu option in the scan setting information, the operation according to the processing not included in the scan setting information. FIG. 15 shows an example of the scan setting information repeatedly subjected to the additional registration in this step. A "MenuSetting (1001)" tag is structured so that the original processing flow composed of "transfer to another folder", "combine with another document data", and "mail delivery" is added with a hierarchical structure of the respective operations of "PDF conversion", "annotation", and "copy". After the additional registration to the scan setting information as shown in FIG. 15, when the user logs in this document management system and tries to execute scanning through the MFP 50, the user can select one of the above operations displayed in the hierarchy. Specifically, when the user selects "transfer to another folder" in the firstly-displayed screen of FIG. 12A, the display as shown in FIG. 12B is newly displayed. Specifically, "combine with another document data" as well as "PDF conversion" and "copy" are displayed as processing candidates that can be executed after "transfer to another folder". When the user selects "PDF conversion", as shown in FIG. 12C, "annotation" and "mail delivery" are displayed as processing candidates that can be executed after "PDF conversion".

Thus, the user can execute various processings that may be executed after scanning depending on the situation from time to time.

As described above, according to the document management system of this embodiment, a series of operations performed by the user during scanning execution are registered while being associated with the scan button. These series of operations are displayed as a menu in next scan. The user can select up to which operation in the menu should be executed. The user also can later execute the remaining operations that were not selected. The configuration as described above can eliminate, even when the user must execute operations up to the middle of a series of processings associated to the scan button, the need to additionally set or register a workflow for such operations. Furthermore, processings remaining after the operations up to the middle of the series of processings were executed also can be easily executed at a desired timing.

Second Embodiment

In Embodiment 1, a mode for using the scanner function of the MFP 50 was described. Next, a mode for using the present invention to use the print function of the MFP 50 will be described as the second embodiment. Those parts that are the same as those of the respective flowcharts according to Embodiment 1 will be simply described or will not be described. Thus, points different from Embodiment 1 will be mainly described.

(Processing for Setting Print Button)

First, the following section will describe a processing for setting the details of the print button used by the user to instruct a print processing through the MFP 50 (i.e., a processing for registering print setting information).

Figure 16:
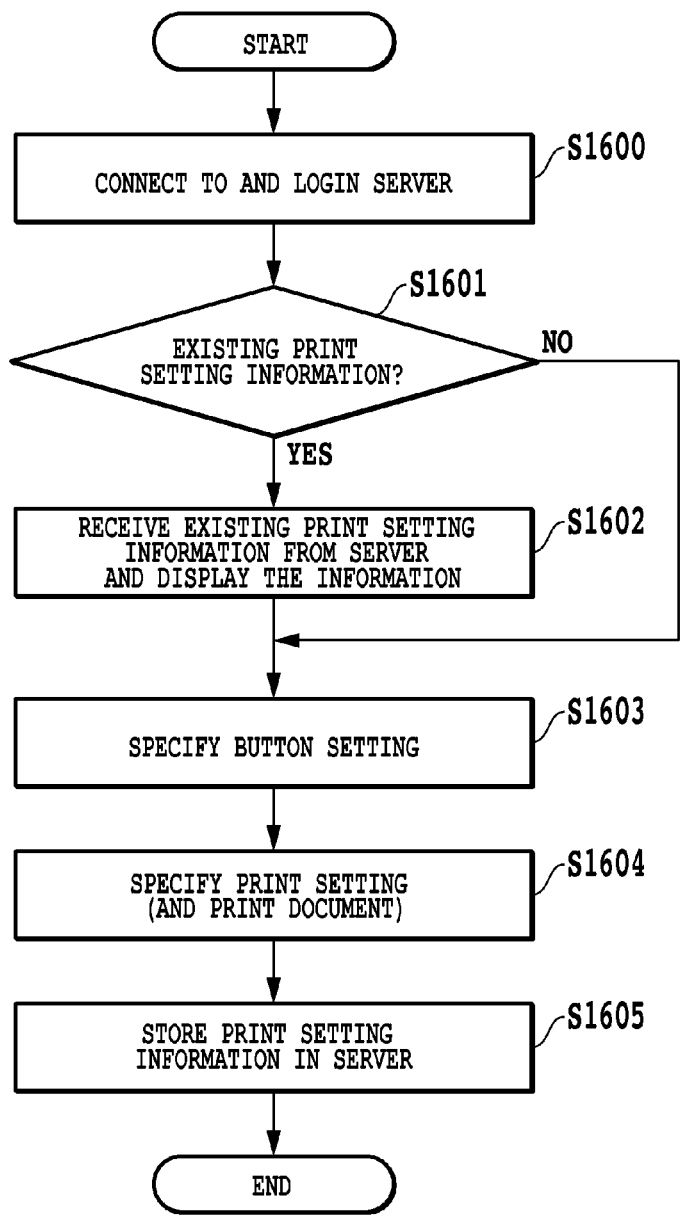
FIG. 16 is a flowchart illustrating the flow of a processing for registering print setting information according to the second embodiment.

FIG. 16 is a flowchart illustrating the processing for registering print setting information. The following section will describe a case where the print setting information is registered by the client PC 10. However, the print setting information also may be registered by each server PC or the MFP 50.

Step 1600 is a user authentication processing that is the same as Step 500 of FIG. 5 in Embodiment 1. When the access authority of the user is confirmed, the processing proceeds to Step 1601.

Next, in Step 1601, the web application server PC 20 confirms, via the main control unit 400, whether print setting information is already registered in the user information storage unit 411 or not. When the print setting information is already registered in the user information storage unit 411, the processing proceeds to Step 1602. When the print setting information is not registered, the processing proceeds to Step 1603.

In Step 1602, the client PC 10 acquires the already-registered print setting information and displays the print setting information on the display 108 of the client PC 10.

In Step 1603, the client PC 10 receives, via the keyboard 107, the setting regarding the print button used by the user to instruct printing. This button setting includes, for example, information such as a button ID, a button name, or a button display form.

In Step 1604, the client PC 10 receives, via the keyboard 107, the setting regarding the printing details (print setting). The contents of the print setting include a color/black-and-white mode for printing or a page layout such as 2 in 1 for example. The button setting in Step 1603 and the print setting in Step 1604 will be hereinafter referred to as "print setting information". The print setting information is stored in an XML-described data format as shown in FIG. 17 for example. During this print setting, the user also can specify the document as a print target.

In Step 1605, the client PC 10 sends the print setting information to the web application server PC 20. The web application server PC 20 stores the received print setting information in the user information storage unit 411 via the main control unit 400.

(Processing for Initial Printing)

Figure 18:
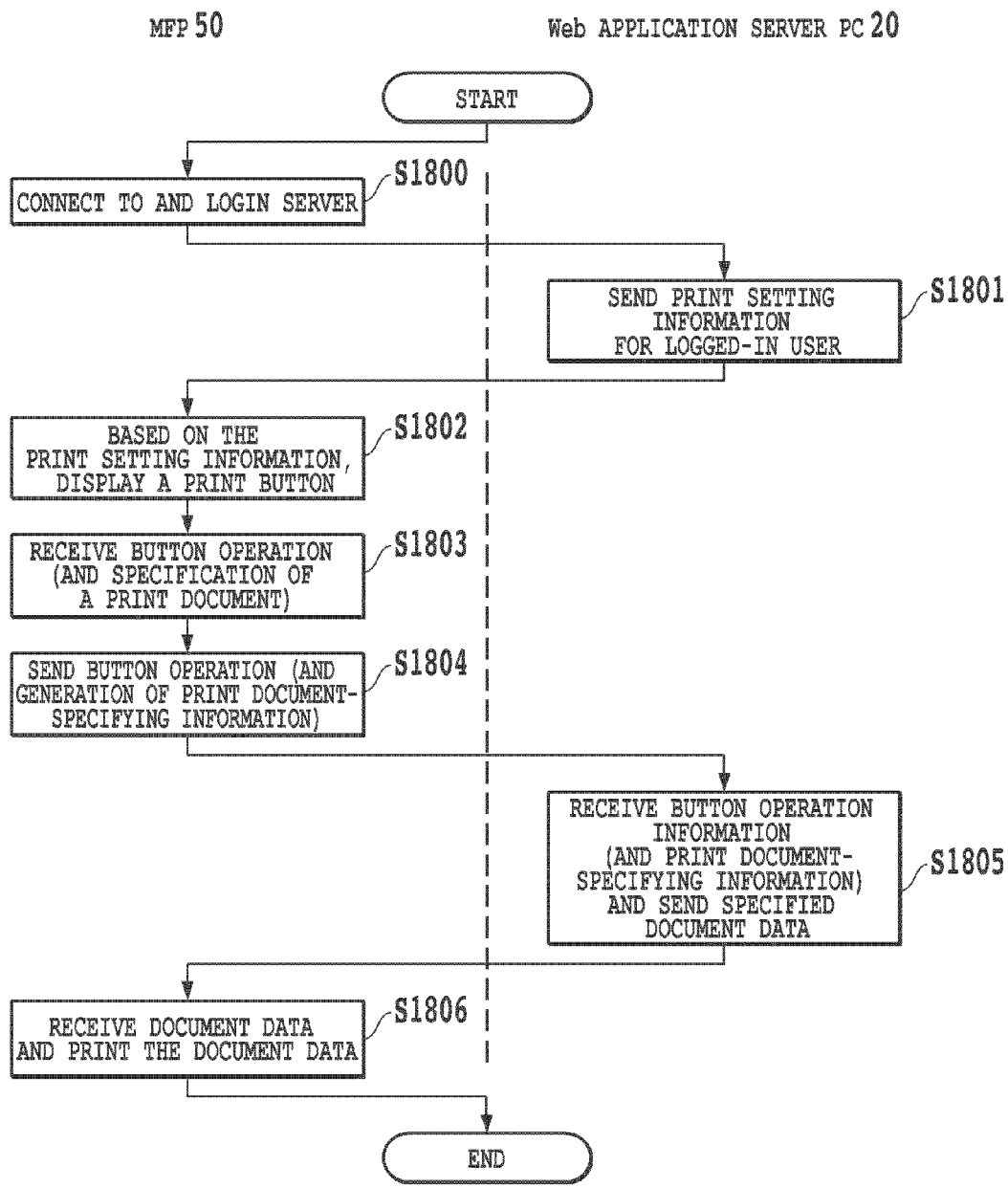
FIG. 18 is a flowchart illustrating the flow of the processing for the initial printing according to the second embodiment.

FIG. 18 is a flowchart illustrating the flow of the processing for the initial printing in the document management system according to this embodiment. As in Embodiment 1, the following flowchart shows the MFP 50 or the client PC 10, and the web application server PC 20 only.

Step 1800 is a user authentication processing that is the same as Step 700 of FIG. 7 in Embodiment 1. When the access authority of the user is confirmed, the processing proceeds to Step 1801.

Next, in Step 1801, the web application server PC 20 confirms, via the main control unit 400, whether the print setting information is already registered in the user information storage unit 411 or not. When the print setting information is already registered in the user information storage unit 411, the print setting information is acquired and is sent to the MFP 50.

In Step 1802, the MFP 50 displays, based on the received print setting information, a print button on the display device 201.

In Step 1803, the MFP 50 receives the depression by the user of the print button. When no document is specified as a print target in Step 1604 of FIG. 16 as described above, the user also specifies in Step 1803 a document as a print target.

In Step 1804, the MFP 50 generates button operation information that shows that the print button was depressed. Then, the MFP 50 sends this button operation information to the web application server PC 20. When a document as a print target is also specified in Step 1803, print document-specifying information is also generated and is sent to the web application server PC 20.

In Step 1805, when the web application server PC 20 receives the button operation information (and print document-specifying information), the web application server PC 20 sends, to the MFP 50, the document data specified by the user.

In Step 1806, the MFP 50 receives the document data. Based on the print setting information received in Step 1802, the MFP 50 prints the document data through a not-shown printer unit.

(Processing for Additional Registration in Print Setting Information)

Figure 19:
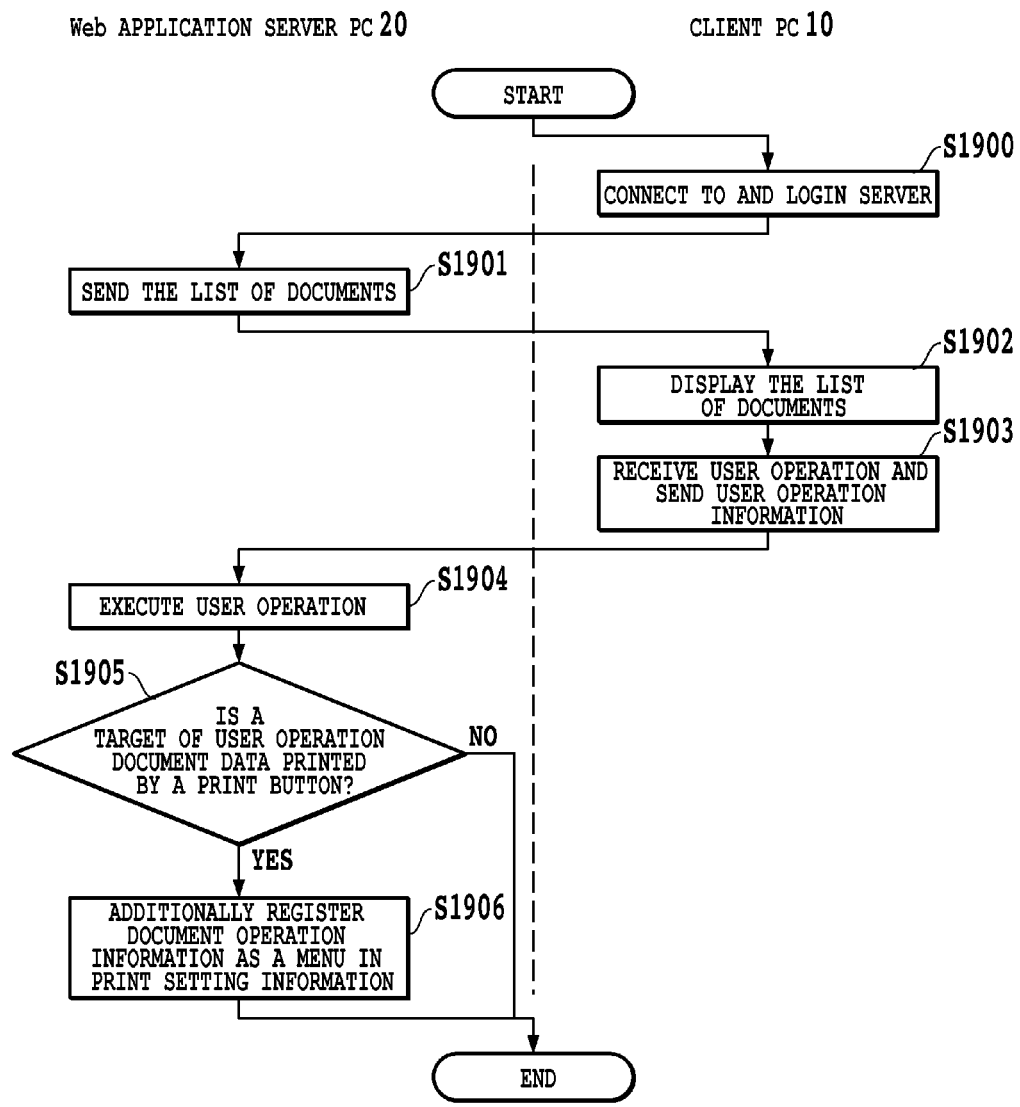
FIG. 19 is a flowchart illustrating the flow of the processing for an additional registration in print setting information according to the second embodiment.

FIG. 19 is a flowchart illustrating the flow of the processing for additionally registering, when an arbitrary processing to the printed document data is instructed by a user, the user operation information corresponding to the instruction in the print setting information.

Step 1900 is a user authentication processing that is the same as Step 800 of FIG. 8 of in Embodiment 1. When the access authority of the user is confirmed, the processing proceeds to Step 1901.

Next, in Step 1901, the web application server PC 20 sends to the client PC 10, via the main control unit 400, the information for the list of the document data regarding the logged-in user stored in the document information storage unit 422.

In Step 1902, the client PC 10 displays, based on the received information for the list of the document data, the list of documents on the display 108. The list of documents is displayed in a tree structure for example.

In Step 1903, the user operation instruction to the document data selected by the user from among the displayed list of documents is received. Then, user operation information showing the contents of the instruction is generated and is sent to the web application server PC 20. The term "operation instruction" means, for example, an instruction given from the user for instructing the execution of a predetermined processing such as "transfer to trash box folder" or "FAX transmission". A plurality of operation instructions also may be received as in Step 803 of FIG. 8 according to Embodiment 1.

In Step 1904, the web application server PC 20 executes, based on the received user operation information, the contents of the operation instruction (e.g., transfer to trash box folder). The web application server PC 20 adds user operation IDs for identifying the individual operation instructions to the respective operation instructions included in user operation information and registers the information in the document operation information storage unit 424.

In Step 1905, the web application server PC 20 determines, the document data as an operation instruction target executed based on the user operation information is document data printed by the print button set through the above-described processing of FIG. 16 or not. This determination is performed, as in Step 805 of FIG. 8, by checking a predetermined identifier added to the document data. Specifically, the determination as described above can be achieved by adding, during the execution of printing, a flag for identifying that the printing was performed to the property of the document data for example. When the determination result shows that there is document data for which printing was executed using the print button, the processing proceeds to Step 1906. When the determination result shows that there is document data other than document data for which printing was executed using the print button, the processing is completed.

Figure 20:
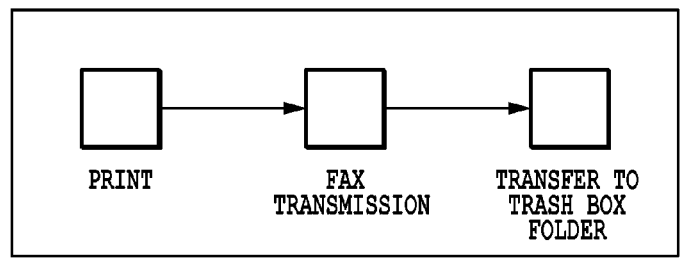
FIG. 20 shows an example of the processing flow additionally registered as a menu in the print setting information according to the second embodiment.

In Step 1906, the web application server PC 20 adds, to the print setting information for the print button used to print the document data, the contents of the user operation information as a print menu. Specifically, in the print setting information set through the above-described processing for registering print setting information (FIG. 16), the respective processings executed in Step 1904 are additionally registered as a flow of the processings that can be executed after printing. When a plurality of operation instructions are given in Step 1903, a series of processings corresponding to the operation instructions are additionally registered in an order of the instruction in this processing flow in the print setting information. For example, when an operation instruction is given to subject the printed document data to the two processing of "mail delivery" and "transfer to trash box folder" in this order, the processing flow as shown in FIG. 20 is additionally registered as a menu. Specifically, the processing flow of a series of processings of "print", "FAX transmission", and "transfer to trash box folder" is registered in this order as a menu in the print setting information. FIG. 21 shows an example of XML-described print setting information in which the user operation information is additionally registered as a menu. As shown, the user operation information for instructing the above-described two processings is additionally registered in the print setting information. As in the case of FIG. 10 of Embodiment 1, a new item of "MenuSetting (2101)" is added and the respective processings of "FAX transmission (2101)" and "transfer to trash box folder (2103)" are additionally registered. "OperationID (2104 and 2105)" added for the respective processings correspond to the respective user operation IDs registered in the document operation information storage unit 424 in Step 1904.

(Processing for the Second and Subsequent Printings)

Figure 22:
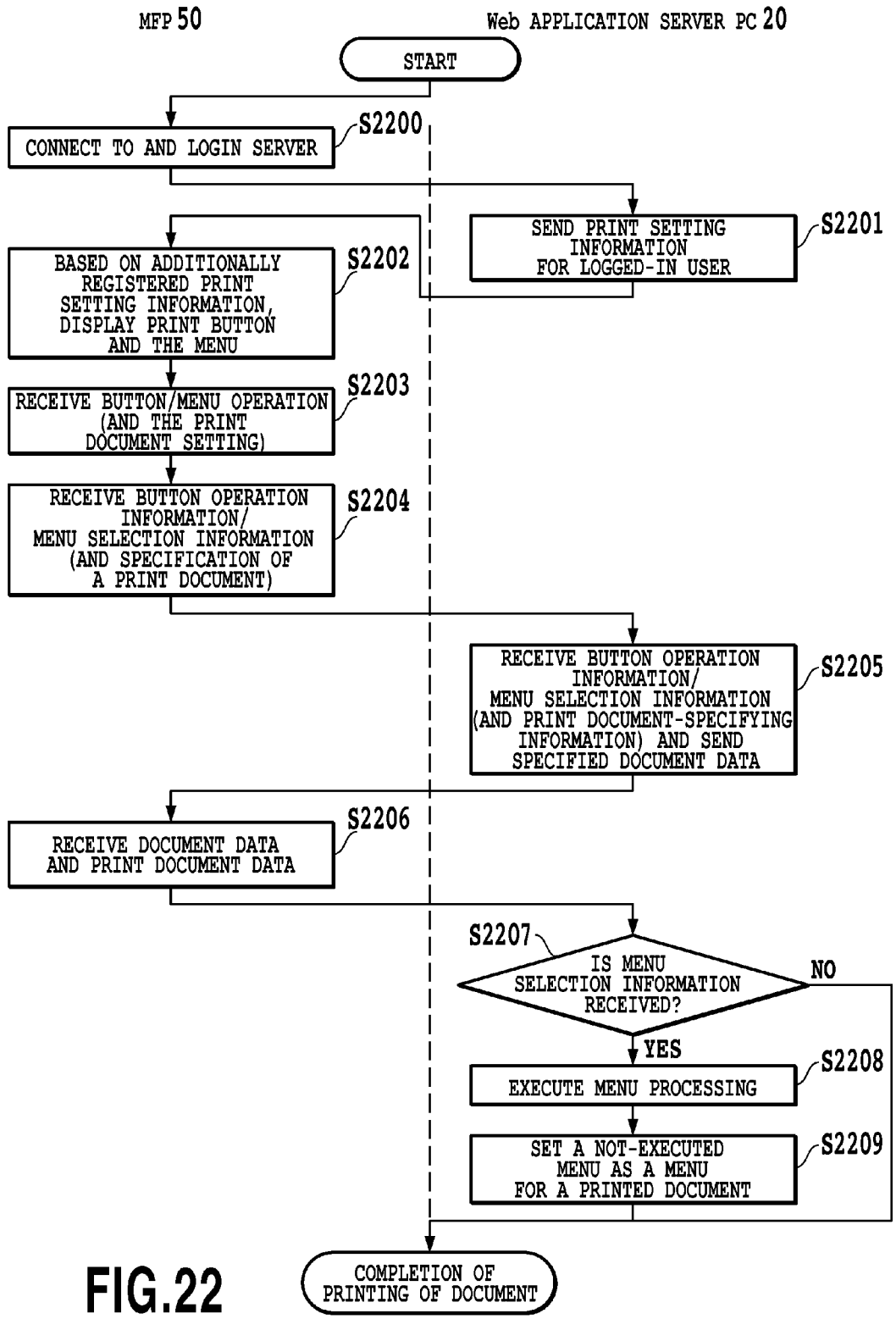
FIG. 22 is a flowchart illustrating the flow of the processings of the second and subsequent printings in the document management system according to the second embodiment.

FIG. 22 is a flowchart illustrating the second and subsequent printings.

Step 2200 is a user authentication processing that is the same as Step 1100 of FIG. 11 of Embodiment 1. When the access authority of the user is confirmed, the processing proceeds to Step 2201.

Next, in Step 2201, the web application server PC 20 acquires, via the main control unit 400, the print setting information registered in the user information storage unit 411 and sends the print setting information to the MFP 50. The sent print setting information is print setting information additionally registered in the previous processing for additionally registering print setting information (FIG. 19).

Figure 23A:
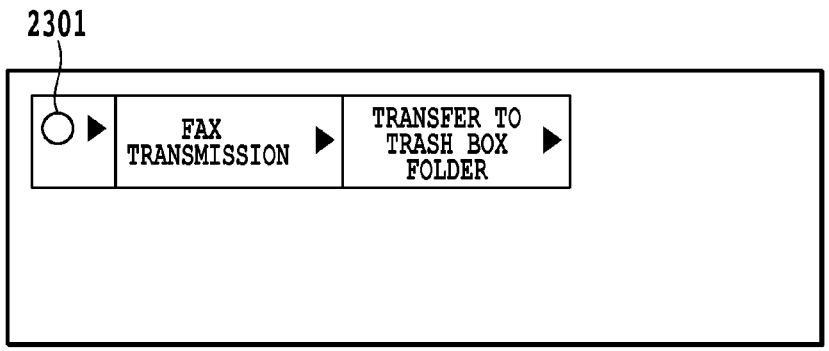
FIG. 23A to FIG. 23C illustrate a mode of a menu display based on the print setting information according to the second embodiment.
Figure 23B:
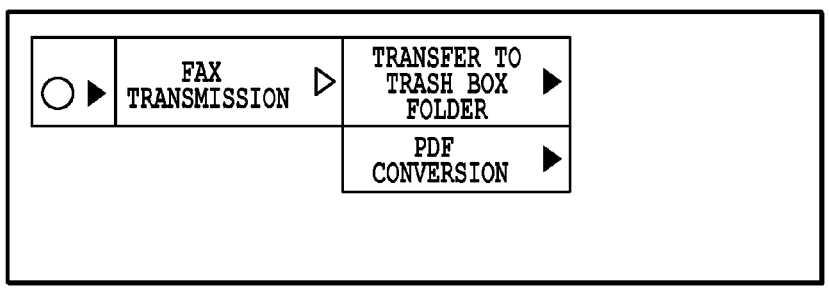
Figure 23C:
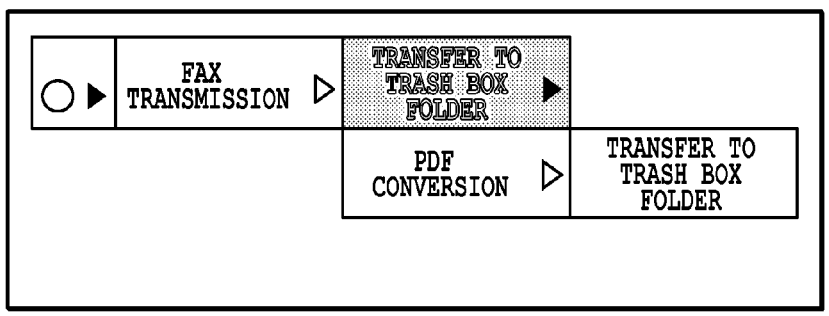

In Step 2202, the MFP 50 displays, based on the received print setting information, the print button on the display device 201. The print setting information includes therein user operation information corresponding to the processing executed in Step 1904 of FIG. 19 that is additionally registered as print setting information. Thus, the print button as well as the contents of the user operation are displayed as a menu. FIG. 23A to FIG. 23C show examples of the menu display displayed on the display device 201 when the print setting information is as in the above-described case of FIG. 21. At the right side of the print button 2301, a processing flow in an order of "FAX transmission" and "transfer to trash box folder" is displayed as a menu.

In Step 2203, the MFP 50 receives the depression of the print button 2301 displayed in Step 2202 and the selection by the user of the menu. The menu selection must be carried out prior to the depression of the print button. In the case of the example of FIG. 23A to FIG. 23C, when the user depresses any of the desired processing region 2302 or 2303, a display processing is performed to display the region in a highlighted manner for example to show that the region is selected. For example, when all processings displayed in the menu are desired to be executed, the user selects the region 2303 of "transfer to trash box folder" and then depresses the print button 2301. As in Step 1804 of FIG. 18 as described above, the document also may be specified as a print target in this step.

In Step 2204, the MFP 50 generates the button operation information showing that the print button was depressed and the menu selection information for a case where any processing is selected from the menu and sends these pieces information to the web application server PC 20. When the document as a print target is also specified in Step 2203, the print document specifying information is generated and is sent to the web application server PC 20.

In Step 2205, when the web application server PC 20 receives the button operation information, the menu selection information (and print document-specifying information), the web application server PC 20 sends the document data specified by the user to the MFP 50.

In Step 2206, the MFP 50 receives the document data. Based on the print setting information received in Step 2202, the received document data is printed through a not-shown printer unit. After the completion of the print processing, the MFP 50 notifies the web application server PC 20 that the print processing is completed.

In Step 2207, the web application server PC 20 confirms whether the menu selection information was received in Step 2205 or not. When the menu selection information was received, the processing proceeds to Step 2208. When the menu selection information was not received, the processing is completed.

In Step 2208, the web application server PC 20 executes the respective processings up to the processing shown in the received menu selection information in the processing flow registered as a menu in the print setting information. For example, when the processing shown by the received menu selection information is "transfer to trash box folder", a processing is firstly performed to subject the print document data to FAX transmission and then a processing is performed to subject the print document data to "transfer to trash box folder". As described above, based on the menu registered in the print setting information, a series of processings up to the processing selected by the user in Step 2203 are executed by the web application server PC 20.

In Step 2209, the web application server PC 20 associates, when the processing shown by the menu selection information is not the rearmost processing in the processing flow, the remaining processings to the print document data. Specifically, when the processing flow registered as a menu still includes the remaining subsequent processings not executed in Step 2208, the remaining processings are associated to the print document data and are stored in the document information storage unit 422. For example, when the user selects "FAX transmission" from the menu, the subsequent processing of "transfer to trash box folder" is stored while being associated with the print document data.

(Processing to Print Document Data Associated with the Remaining Processing(s))

Figure 24:
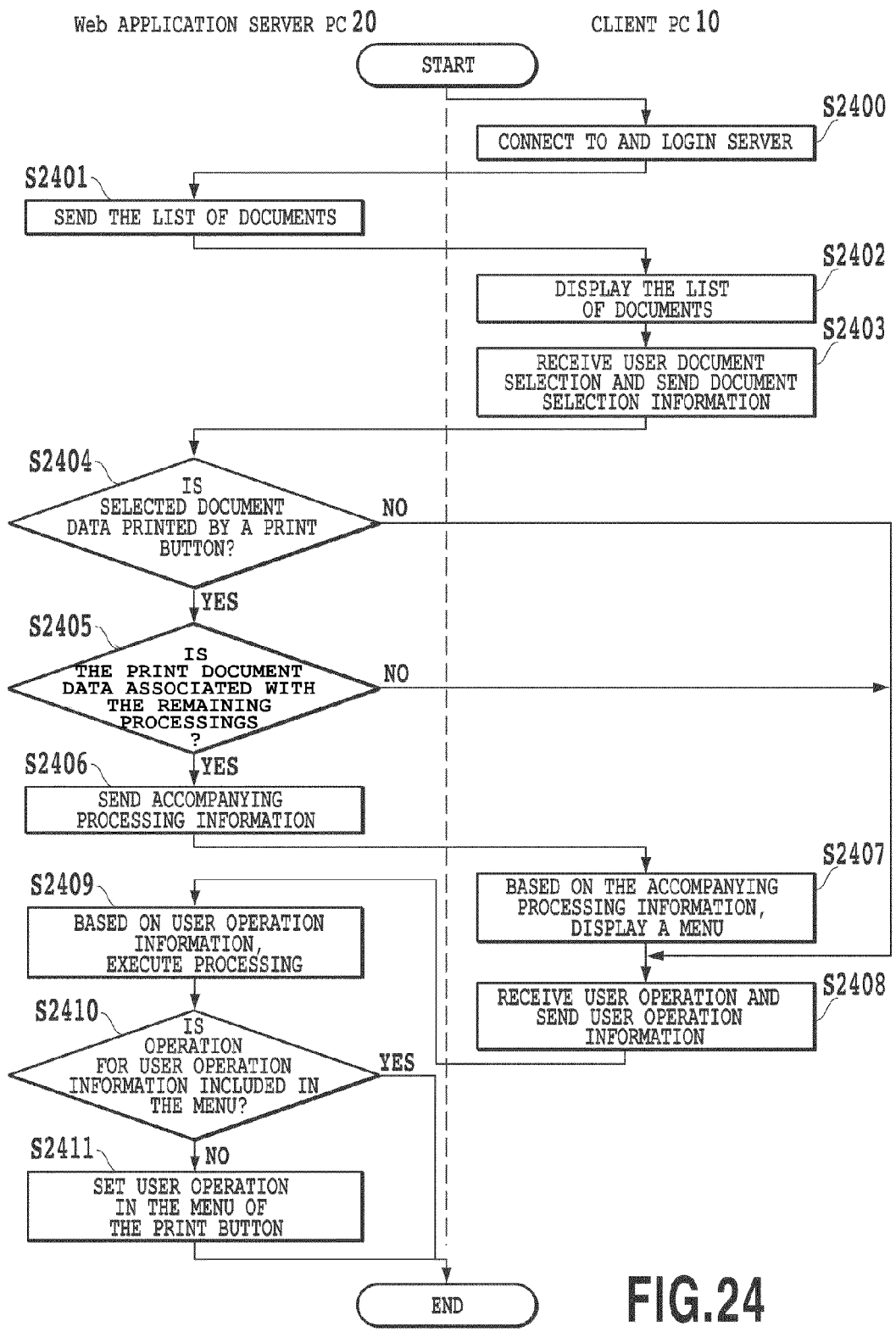
FIG. 24 is a flowchart illustrating the flow of the processing to print document data associated with the subsequent processing according to the second embodiment.

FIG. 24 is a flowchart illustrating the flow of the processing to the print document data associated with the remaining processing based on the flowchart of FIG. 22.

Step 2400 is a user authentication processing that is the same as Step 1300 of FIG. 13 in Embodiment 1. When the access authority of the user is confirmed, the processing proceeds to Step 2401.

Next, in Step 2401, the web application server PC 20 sends to the client PC 10, via the main control unit 400, the information for the list of the document data stored in the document information storage unit 422.

In Step 2402, the client PC 10 displays, based on the received information for the list of the document data, the list of documents on the display 108 of the client PC 10. The list of documents is displayed in a tree structure for example.

In Step 2403, the client PC 10 receives the selection by the user of the document from the displayed list of documents and sends, to the web application server PC 20, such document selection information that shows the selected document.

In Step 2404, the web application server PC 20 determines whether the selected document corresponds to the document data printed using the print button set through the above-described processing of FIG. 16 or not. This determination is the same determination in Step 1905 of FIG. 19 and thus will not be described further. When the determination result shows that the selected document corresponds to the print document data obtained by the above print button, the processing proceeds to Step 2405. When the determination result shows that the selected document corresponds to document data other than the print document data obtained by the above print button, the processing proceeds to Step 2408.

In Step 2405, the web application server PC 20 confirms whether the print document data is associated with the above-described remaining processing or not. When the print document data is associated with the remaining processing, the processing proceeds to Step 2406. When the print document data is not associated with the remaining processing, the processing proceeds to Step 2408.

In Step 2406, the web application server PC 20 generates accompanying processing information that is information showing the remaining processing associated with the print document data. Then, the web application server PC 20 sends the accompanying processing information to the client PC 10.

In Step 2407, the client PC 10 displays, based on the received accompanying processing information, the remaining processing associated with the print document data (processing flow) on the display 108. For example, when the received accompanying processing information shows a processing of "transfer to trash box folder", the remaining processing associated with the print document data is displayed as shown in FIG. 25. Thus, the user can subject the print document data for which the processings up to "FAX transmission" are completed during the first printing to the subsequent processing of "transfer to trash box folder" at a desired timing.

In Step 2408, the client PC 10 receives the processing flow (menu) displayed in Step 2407 or the operation instruction by the user in a general function selection. Then, the client PC 10 generated user operation information that shows a processing instructed by the user to the document data selected in Step 2403 and sends the user operation information to the web application server PC 20.

In Step 2409, the web application server PC 20 executes, based on the received user operation information, the respective processings instructed by the user in Step 2408.

In Step 2410, the web application server PC 20 determines whether or not the processings according to the user operation information received and executed in Step 2409 is included in the processing flow registered as a menu in the print setting information. When the processings are not included in the print setting information, the processing proceeds to Step 2411. When the processings are included in the print setting information, the processing is completed.

In Step 2411, the web application server PC 20 additionally registers the operation corresponding to the processing not included in the print setting information as a new menu option in the print setting information. FIG. 26 shows an example of the print setting information repeatedly subjected to additional registration in this step. The "MenuSetting (2101)" tag is structured so that the original processing flow composed of "FAX transmission" and "transfer to trash box folder" is added with a "PDF conversion" operation in a hierarchical structure. As shown in FIG. 26, after the additional registration to the print setting information, selection can be made from the respective operations displayed in a hierarchical manner when the user logs in this document management system to execute printing through the MFP 50. Specifically, when the user selects "FAX transmission" in the firstly-displayed screen of FIG. 23A, a display as shown in FIG. 23B is newly displayed. Specifically, "transfer to trash box folder" and "PDF conversion" are displayed as processing candidates that can be executed after "FAX transmission". When the user selects "PDF conversion", "transfer to trash box folder" is displayed as a candidate that can be executed after "PDF conversion" as shown in FIG. 23C.

In this manner, the user can efficiently execute various processings that may be executed after printing depending on the situation from time to time.

As described above, according to the document management system of this embodiment, a series of operations performed by the user during the print execution are associated to a print button. Thus, during the next printing, the series of operations are displayed as a menu. The user can select up to which operation among the operations in the menu should be executed. The user also can later execute not-selected operations as the remaining operations.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-086028, filed Apr. 2, 2010, which is hereby incorporated by reference herein in its entirety.

What is claimed is:

1. A document management system comprising a multi-function peripheral having, a scanner function, a web application server PC for storing and managing document data, and a client PC through which a user instructs an operation regarding the document data are connected via a network,
the multi-function peripheral comprising:
a user interface;
a component for acquiring, from the well application server PC, scan setting information including a processing, flow that can be executed after scanning to display the processing flow as a scan menu on the user interface; and
a component for generating menu selection information that, shows a processing selected by the user from the processing flow displayed as the scan menu,
wherein the web application server PC comprises:
a component for storing the scan setting information; and
an execution component that acquires the menu selection information from the multi-function peripheral to execute, after scanning, processings up to the processing selected by the user based on the processing flow.

2. The document management system according to claim 1, wherein the client PC comprises a component for generating user operation information that shows an operation instruction performed by the user to the document data, and
wherein the web application server PC comprises a component, for acquiring, when the document data for which the operation instruction was given by the user through the client PC is scanned document data scanned by the multi-function peripheral, the user operation information to register, in the scan setting information, a series of processings corresponding to the operation instruction as the processing flow that can be executed after the scanning.

3. The document management system according to claim 1, wherein the web application server PC comprises:
a component for associating, when there is a processing remaining in the processing flow that was not executed by the execution component, the remaining processing to a scanned document data scanned by the multi-function peripheral; and
a component for generating accompanying processing information that shows the remaining processing associated to the scanned document data, and
wherein the client PC comprises:
a user interface; and a component for acquiring, when the user selects, as a target document data for an operation instruction, the scanned document data associated with the remaining processing, the accompanying processing information from the web application server PC to display, on the user interface of the client PC, the remaining processing associated to the selected scanned document data.

4. The document management: system according to claim 3, wherein the web application server PC comprises:
a determination component, for acquiring, when the remaining processing is displayed on the user interface of the client PC, a user operation information from the client PC to determine whether the processing flow includes a series of processings corresponding to an operation instruction of the user operation information or not; and
a component for additionally registering, when the determination component determines that the processing flow does not include the series of processings corresponding to the operation instruction, the series of processings corresponding to the operation instruction in the scan setting information as the processing flow that can be executed after the scanning.

5. A document management system comprising a multi-function peripheral having a print function, a web application server PC for storing and managing document data, and a client PC through which a user instructs an operation regarding the document data are connected via a network,
wherein the multi-function peripheral comprises:
a user interface;
a component for acquiring, from the web application server PC, print setting information including a processing flow that can be executed after printing to display the processing flow as a printing menu on the user interface; and
a component for generating menu selection information that shows a processing selected by the user from the processing, flow displayed as the printing menu,
and wherein the web application server PC comprises:
a component for storing the print setting information; and
an execution component that acquires the menu selection information from the multi-function peripheral to execute, after printing, processings up to the processing selected by the user based on the processing flow.

6. The document management system according to claim 5, wherein the client PC comprises to component for generating user operation information that shows an operation instruction performed by the user to the document data, and
wherein the web application server PC comprises a component for acquiring, when the document data for which the operation instruction was given by the user through the client PC is printed document data printed by the multi-function peripheral, the user operation information to register, in the print setting information, a series of processings corresponding to the operation instruction as the processing flow that can be executed after the printing.

7. The document management system according to claim 5, wherein the web application server PC comprises:
a component for associating, when there is to processing remaining in the processing flow that was not executed by the execution component, the remaining processing to a printed document data printed by the multi-function peripheral; and
a component for generating accompanying processing information that shows the remaining processing associated to the printed document data, and
wherein the client PC comprises:
a user interlace; and
a component for acquiring, when the user selects, as a target document data for an operation instruction, the printed document data associated with the remaining processing, the accompanying processing information from the web application server PC to display, on the user interface of the client PC, the remaining processing associated to the selected printed document data.

8. The document management system according to claim 7, wherein the web application server PC comprises:
a determination component for acquiring, when the remaining processing is displayed on the user interface of the client PC, a user operation information from the client PC to determine whether the processing flow includes a series or processings corresponding to an operation instruction of the user operation information or not; and
a component for additionally registering, when the determination component determines that the processing flow does not include the series of processings corresponding to the operation instruction, the series of processings corresponding to the operation instruction in the print setting in formation as the processing flow that can be executed after the printing.

9. A document management method in a document management system comprising a multi-function peripheral having a scanner function, a well application server PC for storing and managing document data, and a client PC through which a user instructs an operation regarding the document data are connected via a network, the method comprising;
in the multi-function peripheral,
a step of acquiring, from the web application server PC, scan setting information including a processing flow that can be executed after scanning to display the processing now as a scan menu on a user interface; and
a step of generating menu selection information that shows is processing selected by the user from the processing flow displayed as the scan menu, and
in the web application server PC,
a step of storing the scan setting information; and
an execution step of acquiring the menu selection information from the multi-function peripheral to execute, after scanning, processings up to the processing selected by the user based on the processing flow.

10. A document management method in a document management system comprising a multi-function peripheral having a print function, a web application server PC for storing and managing document data, and a client PC through which a user instructs an operation regarding the document data are connected via a network, the method comprising:
in the multi-function peripheral,
a step of acquiring, from the web application server PC, print setting information including a processing flow that can be executed after priming to display the processing flow as a printing menu on a user interlace; and
a step of generating menu selection information that shows a processing selected by the user from the processing now displayed as the printing menu, and
in the web application server PC,
a step of storing the print setting information; and
a step of acquiring the menu selection information from the multi-function peripheral to execute, after printing, processings up to the processing selected by the user based on the processing now.

11. A non-transitory computer-readable recording medium having computer-executable instructions for causing a method to be performed, in a document management system comprising multi-function peripheral having a scanner function, a web application server PC for storing and managing document data, and a client PC through which a user instructs an operation regarding, the document data are connected via a network, the method comprising:
  in the multi-function peripheral,
    a step of acquiring, from the web application server PC, scan setting information including a processing flow that can be executed after scanning to display the processing flow as a scan menu on a user interface; and
    a step of generating menu selection in that shows a processing selected by the user from the processing flow displayed as the scan menu, and
  in the web application server PC,
    a step of storing the scan setting information; and
    an execution step of acquiring the menu selection information from the multi-function peripheral to execute, after scanning, processings up to the processing selected by the user based on the processing flow.

12. A non-transitory computer-readable recording medium having computer-executable instructions for causing a method to be performed, in a document management system comprising a multi-function peripheral having a print function, a web application server PC for storing managing document data, and a client PC through which a user instructs an operation regarding the document data are connected via a network, the method comprising:
  in the multi-function peripheral,
    a step of acquiring, from the web application server PC, print setting information including a processing flow that can be executed after printing to display the processing flow as a printing menu on a user interlace; and
    a step of generating menu selection information that shows a processing selected by the user from the processing flow displayed as the printing menu,
  in the web application server PC,
    a step of storing the print setting information; and
    a step of acquiring the menu selection information from the multi-function peripheral to execute, after printing, processings up to the processing selected by the user based on the processing flow.

* * * * *